(12) United States Patent
Phumkhokrak

(10) Patent No.: US 12,456,025 B2
(45) Date of Patent: *Oct. 28, 2025

(54) METHODS, APPARATUSES AND COMPUTER PROGRAM PRODUCTS FOR PROVIDING ARTIFICIAL-INTELLIGENCE-BASED INDICIA DATA EDITING

(71) Applicant: Hand Held Products, Inc., Charlotte, NC (US)

(72) Inventor: Samran Phumkhokrak, Tambon (TH)

(73) Assignee: Hand Held Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/773,061

(22) Filed: Jul. 15, 2024

(65) Prior Publication Data

US 2024/0370681 A1 Nov. 7, 2024

Related U.S. Application Data

(63) Continuation of application No. 18/461,350, filed on Sep. 5, 2023, now Pat. No. 12,073,286, which is a continuation of application No. 17/575,264, filed on Jan. 13, 2022, now Pat. No. 11,783,146.

(51) Int. Cl.
*G06K 7/14* (2006.01)
*G06F 3/0482* (2013.01)
(Continued)

(52) U.S. Cl.
CPC ......... *G06K 7/1482* (2013.01); *G06F 3/0482* (2013.01); *G06F 3/04847* (2013.01); *G06K 7/1417* (2013.01); *G06V 10/751* (2022.01)

(58) Field of Classification Search
None
See application file for complete search history.

(56) References Cited

U.S. PATENT DOCUMENTS

| 9,047,385 | B1 | 6/2015 | Malkin et al. |
| 11,783,146 | B2* | 10/2023 | Phumkhokrak ...... G06K 7/1482 |
| | | | 235/462.15 |

(Continued)

FOREIGN PATENT DOCUMENTS

WO 2021/239287 A1 12/2021

OTHER PUBLICATIONS

U.S. Appl. No. 18/461,350, filed Sep. 5, 2023, 2023/0409856, Allowed.

(Continued)

*Primary Examiner* — Kristy A Haupt
(74) *Attorney, Agent, or Firm* — Alston & Bird LLP

(57) ABSTRACT

Methods, apparatuses and computer program products for providing artificial-intelligence-based indicia data editing are provided. For example, an example computer-implemented method may include determining, based at least in part on a data processing model associated with a scan setting module, a first decoded data string corresponding to a first indicia; determining, based at least in part on user input data, a first input data string corresponding to the first indicia; generating a predictive indicia data editing model based at least in part on providing the first decoded data string and the first input data string to an artificial intelligence algorithm; and updating the scan setting module based at least in part on the predictive indicia data editing model.

20 Claims, 14 Drawing Sheets

(51) Int. Cl.
*G06F 3/04847* (2022.01)
*G06V 10/75* (2022.01)

(56) References Cited

U.S. PATENT DOCUMENTS

| 12,073,286 B2* | 8/2024 | Phumkhokrak ...... G06K 7/1482 |
| 2013/0048734 A1 | 2/2013 | Bianconi et al. |
| 2014/0046880 A1 | 2/2014 | Breckenridge et al. |
| 2014/0282210 A1 | 9/2014 | Bianconi |
| 2016/0307017 A1 | 10/2016 | Bianconi |
| 2017/0091606 A1 | 3/2017 | Gao |
| 2020/0193281 A1 | 6/2020 | Wilfred et al. |

OTHER PUBLICATIONS

U.S. Appl. No. 17/575,264, filed Jan. 13, 2022, U.S. Pat. No. 11,783,146, Issued.

Communication about intention to grant a European patent Mailed on Jun. 24, 2024 for EP Application No. 22212231, 6 page(s).
European search report Mailed on May 25, 2023 for EP Application No. 22212231, 7 page(s).
Notice of Allowance and Fees Due (PTOL-85) Mailed on Apr. 15, 2024 for U.S. Appl. No. 18/461,350, 9 page(s).
Notice of Allowance and Fees Due (PTOL-85) Mailed on Jun. 5, 2023 for U.S. Appl. No. 17/575,264, 9 page(s).
Zebra Technologies Corp., Video: Creating Function Keys Trigger Barcodes Using ADF and 123Scan Utility, https://zebratechnologies.force.com/s/article/Video-Creating-Function-Keys-Trigger-Barcodes-using-ADF-and-123Scan-Utility?language=en_US, Oct. 20, 2021.
Decision to grant a European patent Mailed on Oct. 17, 2024 for EP Application No. 22212231, 2 page(s).
Notice of Allowance and Fees Due (PTOL-85) Mailed on Jul. 22, 2024 for U.S. Appl. No. 18/461,350, 2 page(s).
Zebra Technologies Corporation, Inc., Advanced Data Formatting Programmer Guide, 72E-69680-07, Revision A, 358 pgs., (Jun. 2019).

* cited by examiner

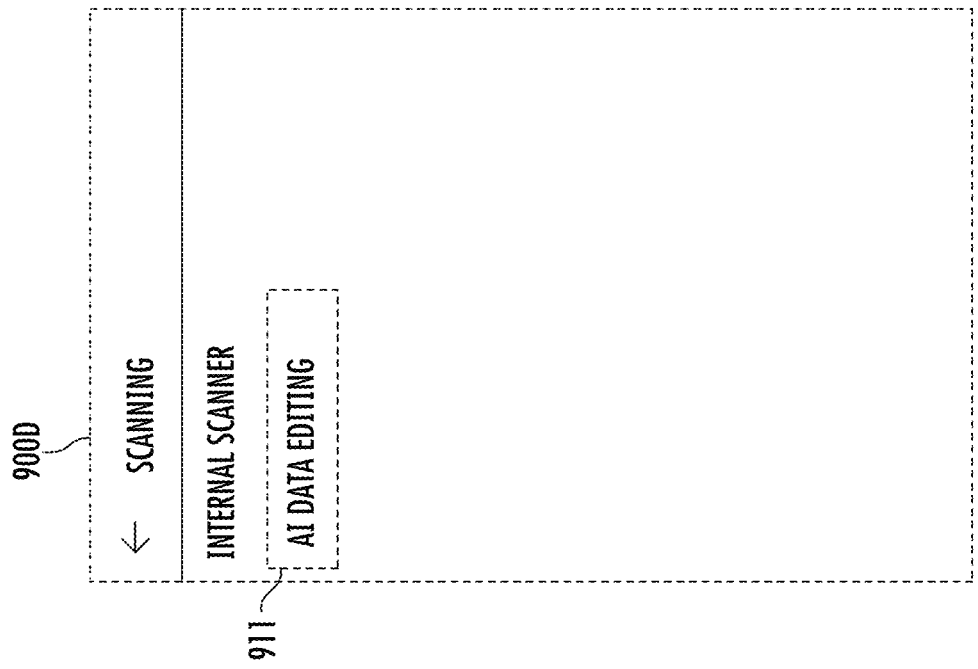

METHODS, APPARATUSES AND COMPUTER PROGRAM PRODUCTS FOR PROVIDING ARTIFICIAL-INTELLIGENCE-BASED INDICIA DATA EDITING

CROSS-REFERENCE TO RELATED APPLICATIONS

This patent application is a continuation of U.S. patent application Ser. No. 18/461,350, filed Sep. 5, 2023, which is a continuation of U.S. patent application Ser. No. 17/575,264, filed Jan. 13, 2022 (now U.S. Pat. No. 11,783,146, issued Oct. 10, 2023), which is incorporated herein by reference in its entirety.

FIELD OF THE INVENTION

Example embodiments of the present disclosure relate generally to capturing and editing indicia data and, more particularly, to methods, apparatuses and computer program products for providing artificial-intelligence-based indicia data editing.

BACKGROUND

A barcode reader (also referred to as a barcode scanner) is an electronic device that can capture information stored in barcodes. Applicant has identified many technical challenges and difficulties associated with barcode readers/scanners, as well as methods and systems related to barcode readers/scanners.

BRIEF SUMMARY

Various embodiments described herein relate to methods, apparatuses, and computer program products for providing artificial-intelligence-based (AI-based) indicia data editing.

In accordance with various embodiments of the present disclosure, an apparatus is provided. In some embodiments, the apparatus comprises at least one processor and at least one non-transitory memory comprising program code. In some embodiments, the at least one non-transitory memory and the program code are configured to, with the at least one processor, cause the apparatus to at least: determine, based at least in part on a data processing model associated with a scan setting module, a first decoded data string corresponding to a first indicia; determine, based at least in part on user input data, a first input data string corresponding to the first indicia; generate a predictive indicia data editing model based at least in part on providing the first decoded data string and the first input data string to an artificial intelligence algorithm; and update the scan setting module based at least in part on the predictive indicia data editing model.

In some embodiments, prior to receiving the first decoded data string, the at least one non-transitory memory and the program code are configured to, with the at least one processor, cause the apparatus to: receive indicia imaging data associated with the first indicia from an indicia data capturing device; and generate the first decoded data string based at least in part on the indicia imaging data and the data processing model.

In some embodiments, the artificial intelligence algorithm comprises at least one pattern matching algorithm.

In some embodiments, the artificial intelligence algorithm comprises at least one regular expression algorithm.

In some embodiments, the predictive indicia data editing model defines at least one predictive indicia data editing indication.

In some embodiments, prior to updating the scan setting module, the at least one non-transitory memory and the program code are configured to, with the at least one processor, cause the apparatus to: render a predictive indicia data editing user interface. In some embodiments, the predictive indicia data editing user interface comprises at least one predictive indicia data editing user interface element based on the at least one predictive indicia data editing indication.

In some embodiments, the predictive indicia data editing user interface further comprises: at least one confirm button user interface element corresponding to the at least one predictive indicia data editing user interface element, and at least one edit button user interface element corresponding to the at least one predictive indicia data editing user interface element.

In some embodiments, the at least one non-transitory memory and the program code are configured to, with the at least one processor, cause the apparatus to: receive user selection input data associated with the at least one confirm button user interface element; and in response to receiving the user selection input data, update the scan setting module based at least in part on the at least one predictive indicia data editing indication.

In some embodiments, the at least one non-transitory memory and the program code are configured to, with the at least one processor, cause the apparatus to: receive user selection input data associated with the at least one edit button user interface element; in response to receiving the user selection input data, render an updated predictive indicia data editing user interface comprising at least one edit option user interface element; receive user edit input data associated with the at least one edit option user interface element; generate at least one updated predictive indicia data editing indication based at least in part on the at least one predictive indicia data editing indication and the user edit input data; and update the scan setting module based at least in part on the at least one updated predictive indicia data editing indication.

In some embodiments, the predictive indicia data editing user interface further comprises at least one of a prefix editing user interface element, a suffix editing user interface element, and a symbology identifier (ID) editing user interface element.

In some embodiments, the at least one non-transitory memory and the program code are configured to, with the at least one processor, cause the apparatus to: receive user edit input data associated with the at least one of the prefix editing user interface element, the suffix editing user interface element, and the symbology ID editing user interface element; and update the at least one predictive indicia data editing indication based at least in part on the user edit input data.

In some embodiments, the at least one predictive indicia data editing indication comprises at least one predictive editing applicability indication and at least one predictive editing operation indication.

In some embodiments, the at least one predictive editing applicability indication defines at least one characteristic requirement based on the first decoded data string. In some embodiments, the at least one predictive editing operation indication defines at least one indicia data editing operation based on the first decoded data string and the first input data string.

In some embodiments, the at least one non-transitory memory and the program code are configured to, with the at least one processor, cause the apparatus to: receive a second decoded data string corresponding to a second indicia; and determine whether the second decoded data string satisfies the at least one characteristic requirement.

In some embodiments, the at least one non-transitory memory and the program code are configured to, with the at least one processor, cause the apparatus to: in response to determining that the second decoded data string satisfies the at least one characteristic requirement: generate a predictive data string based at least in part on providing the second decoded data string to the predictive indicia data editing model; and transmit the predictive data string to a keyboard module.

In some embodiments, the at least one non-transitory memory and the program code are configured to, with the at least one processor, cause the apparatus to: in response to determining that the second decoded data string does not satisfy the at least one characteristic requirement, transmit the second decoded data string to a keyboard module.

In accordance with various embodiments of the present disclosure, a computer-implemented method is provided. In some embodiments, the computer-implemented method comprises determining, based at least in part on a data processing model associated with a scan setting module, a first decoded data string corresponding to a first indicia; determining, based at least in part on user input data, a first input data string corresponding to the first indicia; generating a predictive indicia data editing model based at least in part on providing the first decoded data string and the first input data string to an artificial intelligence algorithm; and updating the scan setting module based at least in part on the predictive indicia data editing model.

In accordance with various embodiments of the present disclosure, a computer program product is provided. In some embodiments, the computer program product comprises at least one non-transitory computer-readable storage medium having computer-readable program code portions stored therein. In some embodiments, the computer-readable program code portions comprise an executable portion configured to: determine, based at least in part on a data processing model associated with a scan setting module, a first decoded data string corresponding to a first indicia; determine, based at least in part on user input data, a first input data string corresponding to the first indicia; generate a predictive indicia data editing model based at least in part on providing the first decoded data string and the first input data string to an artificial intelligence algorithm; and update the scan setting module based at least in part on the predictive indicia data editing model.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 9C illustrates an example user interface that is rendered on a display in accordance with example embodiments of the present disclosure;

FIG. 9D illustrates an example user interface that is rendered on a display in accordance with example embodiments of the present disclosure;

DETAILED DESCRIPTION OF THE INVENTION

Figure 1:
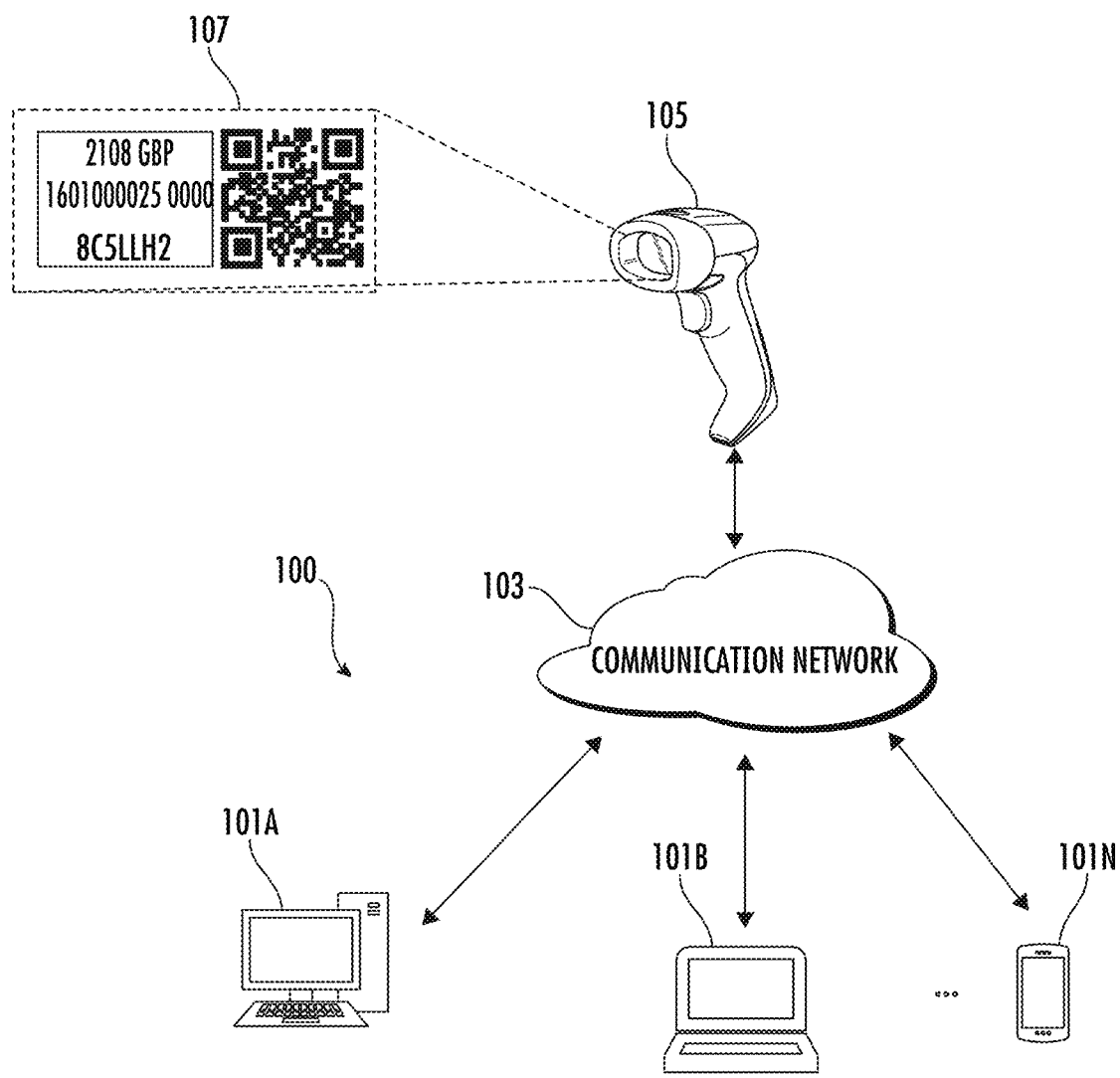
FIG. 1 is an example system architecture diagram illustrating an example indicia data capturing and editing platform in accordance with some embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

In the present disclosure, the term "indicia" refers to one or more machine-readable/machine-decodable codes that represent data and information in a visual form that may include, but not limited to, patterns, lines, numbers, letters, and/or the like. Examples of indicia may include, but are not limited to, one-dimensional (1D) barcodes, two-dimensional (2D) barcodes, Quick Response (QR) code, information-based indicia, Aztec codes, data matrix, texts, and/or the like. In some embodiments, indicia may be affixed, printed, or otherwise attached to items and/or objects to provide information regarding the item or the object in a machine-readable/machine-decodable format.

In some embodiments, to capture data and/or information from indicia, an indicia data capturing device may be used. In the present disclosure, the term "indicia data capturing device" refers to a device that reads and/or scans indicia. Examples of indicia data capturing devices may include, but are not limited to, barcode scanners, QR code scanners, imaging scanners, area-image scanners, imaging readers, and/or the like. In some embodiments, an example indicia data capturing device may be hand-held (for example, a scanner that can be moved by a user's hand over the indicia being scanned). In some embodiments, an example indicia data capturing device may be fixedly mounted (for example, a scanner that is mounted on top of a counter or a table).

As an example, a user may trigger an indicia data capturing device (e.g., by pulling a trigger of an indicia data capturing device, by pointing an indicia data capturing device in streaming mode at the indicia, etc.) to capture indicia imaging data of the indicia. In some embodiments, the indicia imaging data may comprise digital images of the indicia. In some embodiments, the indicia data capturing device may illuminate its field of view with a visible light source (such as, but not limited to, white light, laser light) through its illumination component during image capture, especially in low lighting conditions. In some embodiments, illuminating the indicia during imaging helps ensure that the captured indicia imaging data is suitable for processing.

In some embodiments, after the indicia data capturing device captures the indicia imaging data, the indicia data capturing device may process the indicia imaging data through a processor that is part of an indicia data capturing device. Additionally, or alternatively, after the indicia data capturing device captures the indicia imaging data, the indicia data capturing device may transmit the indicia imaging data to an indicia data editing device, and the indicia data editing device may process the indicia imaging data through a processor that is part of the indicia data editing device. As such, various example embodiments of the present disclosure enable the indicia imaging data to be processed through a processor that is either part of the indicia data capturing device or part of the indicia data editing device that is communicatively coupled to the indicia data capturing device. In some embodiments, the processor recognizes the indicia from the indicia imaging data and decodes the indicia according to a type of the indicia (such as, but not limited to, 1D barcodes, 2D barcodes, QR codes and/or the like) and/or a symbology format of the indicia (such as, but not limited to, Code 11, Code 128, and/or the like).

There are many technical challenges and difficulties associated with capturing and/or processing data and/or information from indicia.

For example, different users may have different requirements for processing the indicia imaging data, and the indicia imaging data may be processed differently in different use cases. As an example, a user may use an indicia data capturing device to capture indicia imaging data of the indicia that is attached on an item in order to determine an item identifier of the item. The format of the item identifier may be determined by an asset management system and/or according to an item identification protocol. In this example, the user may use an indicia data capturing device to capture indicia imaging data associated with the indicia.

In some embodiments, the indicia data capturing device and/or the indicia data editing device may process indicia imaging data to generate one or more decoded data strings. In some embodiments, each of the one or more decoded data strings may include one or more characters and/or one or more numbers. Continuing from the example above, the decoded data string based on the indicia imaging data of an indicia associated with an item may include the following characters and/or numbers:

ABC1234567890

In some embodiments, the decoded data strings may not reflect the desired data and/or information that would satisfy requirements from users (for example, formatting requirements) and/or according to specific user cases. For example, the decoded data string may include one or more characters and/or one or more numbers that should be removed according to the formatting requirements. Additionally, or alternatively, the decoded data string may not include one or more characters and/or numbers that are required by the formatting requirements. Additionally, or alternatively, the decoded data string may include one or more characters and/or numbers that are out of order according to the formatting requirements.

Continuing from the example above, the corresponding data string of the same indicia associated with the same item that has been formatted to satisfy the requirements by the asset management system and/or the item identification protocol may be as follows:

123456789Z

As illustrated in the example above, there are discrepancies between the decoded data string based on the indicia imaging data and the formatted data string, which can cause technical disadvantages and difficulties. For example, if the indicia data capturing device or the indicia data editing device provide the decoded data string "ABC1234567890" to a downstream device, application, or process (for example, to a keyboard module described herein), the downstream device, application, or process may not be able to determine what the decoded data string indicates because of its incorrect formatting, and may not be able to use the decoded data string properly in the downstream device, application, or process.

Continuing from the example above, the user may use an asset management software application provided by the asset management system. The asset management software application may receive the decoded data string, and may provide the decoded data string to an input field of the asset management software application. Because the decoded data string is not formatted based on the requirements of the asset management system and/or the item identification protocol, the asset management software application may not be able to properly identify the item to which the indicia are attached based on the decoded data string.

In some examples, users may manually edit the decoded data string prior to the decoded data string being sent to a downstream device, application, or process. However, manual editing by the users can be technically complex, error-prone and time-consuming. For example, there may be hundreds to thousands of items to be tracked/identified in an asset management system. Manually editing the decoded data strings for each of the hundreds to thousands of indicia can be impractical. Additionally, or alternatively, manual editing may consume and exhaust computing resources of the indicia data capturing device and the indicia data editing device, and may reduce or limit the computing power or bandwidth of such devices.

In contrast, various embodiments of the present disclosure overcome these technical difficulties and challenges, and provide various technical improvements.

For example, various embodiments of the present disclosure provide an artificial intelligence (AI) based data editing engine that allows users to conduct data editing on mobile devices (such as, but not limited to, indicia data editing devices described herein). In some embodiments, the AI based data editing engine is configured to learn data editing logic and to confirm the learned logic with users before applying the learned logic on future data received by scanning indicia.

In some embodiments, the AI-based data editing engine may be provided in the form of a software plugin to a data editing software that has been installed on the indicia data editing device, and therefore does not require any additional software or even internet connection. In some embodiments, the AI-based data editing engine may focus on the problem and the goal design in conducting data editing, instead of requiring users to specify details of operations and processes of data editing. For example, the AI-based data editing engine may analyze the decoded data string, analyze the input data string, and programmatically generate a predictive indicia data editing model that includes predictive indicia data editing indications. The AI-based data editing engine provides mobility to users so that they can perform data editing by themselves on the field.

As such, various embodiments of the present disclosure may provide technical advantages and improvements such as, but not limited to, reducing computing resources consumption in indicia data editing and improving accuracy in processing indicia imaging data, details of which are described herein.

FIG. 1 illustrates an example indicia data capturing and editing platform 100 within which embodiments of the present disclosure may operate. In the example shown in FIG. 1, the indicia data capturing and editing platform 100 may comprise an indicia data capturing device 105 in electronic communication with one or more indicia data editing devices 101A, 101B, . . . 101N via a communication network 103. In some embodiments, the indicia data capturing and editing platform 100 may provide AI-based indicia data editing.

For example, the indicia data capturing and editing platform 100 may capture and edit indicia data associated with the indicia 107. While the indicia 107 in the example shown in FIG. 1 comprises texts, numbers, and a QR code, it is noted that the scope of the present discourse is not limited to the example shown in FIG. 1. As described above, an example indicia in accordance with embodiments of the present disclosure may include, but are not limited to, 1D barcodes, 2D barcodes, information-based indicia, Aztec codes, data matrix, and/or the like.

In some embodiments, a user may utilize the indicia data capturing device 105 of the indicia data capturing and editing platform 100 to capture indicia imaging data associated with the indicia 107. For example, a user may trigger the indicia data capturing device 105 by pointing the indicia data capturing device 105 to the indicia 107 and pulling the trigger of the indicia data capturing device 105. In some embodiments, the indicia data capturing device 105 may comprise an imaging component that comprises an imaging sensor. The imaging sensor may capture an image of the indicia 107, and may generate indicia imaging data corresponding to the indicia 107. In some embodiments, the indicia data capturing device 105 may comprise an illumination component that may illuminate the field of view of the imaging sensor so as to improve the imaging quality of the indicia imaging data.

In some embodiments, the indicia data capturing device 105 may communicate data and/or information (such as, but not limited to, indicia imaging data) to the one or more indicia data editing devices 101A, 101B, . . . , 101N. In some embodiments, the communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network 103 may include an 802.11, 802.16, 802.20, and/or WiMax network. Further, the communication network 103 may include a public network (such as the Internet), a private network (such as an intranet), or combinations thereof, and may utilize a variety of networking protocols including, but not limited to, TCP/IP based networking protocols. For instance, the networking protocol may be customized to suit the needs of the indicia data capturing device 105. In some embodiments, the protocol is a custom protocol of JSON objects sent via a WebSocket channel. In some embodiments, the protocol is JSON over RPC, JSON over REST/HTTP, and the like.

While the description above provides some examples of the communication network that can facilitate data communications between the indicia data capturing device 105 and the indicia data editing devices 101A, 101B, . . . , 101N, it is noted that the scope of the present disclosure is not limited to the description above. In some embodiments, the indicia data capturing device 105 may communicate with the indicia data editing devices 101A, 101B, . . . , 101N through other means. For example, the indicia data capturing device 105 may communicate with the indicia data editing devices 101A, 101B, . . . , 101N through communication protocols such as, but not limited to, general packet radio service (GPRS), Universal Mobile Telecommunications System (UMTS), Code Division Multiple Access 1900 (CDMA1900), CDMA1900 1X (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibrec, Bluetooth protocols, wireless universal serial bus (USB) protocols, and/or any other wireless protocol. The indicia data capturing device 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In some embodiments, the one or more indicia data editing devices 101A, 101B, . . . , 101N may receive indicia imaging data from the indicia data capturing device 105, and may process the indicia imaging data to generate one or more decoded data strings that correspond to the indicia 107. Additionally, or alternatively, the indicia data capturing device 105 may generate one or more decoded data strings based on the indicia imaging data, and may transmit the one or more decoded data strings to the one or more indicia data editing devices 101A, 101B, . . . , 101N.

In some embodiments, the one or more indicia data editing devices 101A, 101B, 101N may generate a predictive indicia data editing model that defines predictive indicia data editing indication for editing the one or more decoded data strings. For example, the one or more indicia data editing devices 101A, 101B, . . . , 101N may receive a decoded data string corresponding to a first indicia, may receive a first input data string corresponding to the first indicia, and may generate the predictive indicia data editing model based at least in part on providing the first decoded data string and the first input data string to an artificial intelligence algorithm. In some embodiments, the one or more indicia data editing devices 101A, 101B, . . . , 101N may update a scan setting module associated with the indicia data capturing device 105 and/or the one or more indicia data editing devices 101A, 101B, . . . , 101N based at least in part on the predictive indicia data editing model, details of which are described herein.

Figure 2:
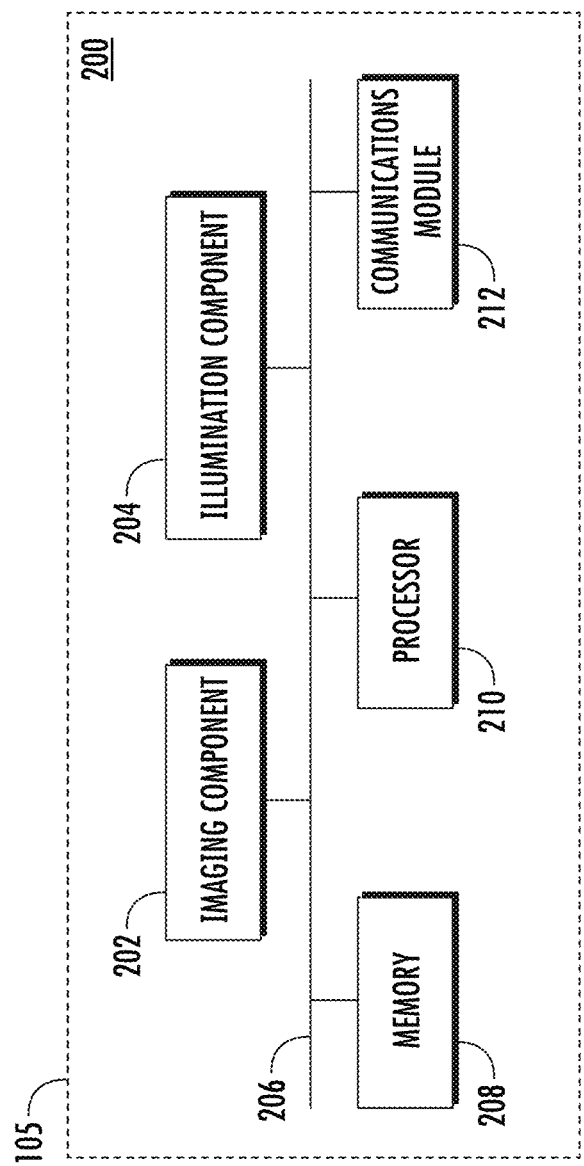
FIG. 2 illustrates an example block diagram of an example indicia data capturing device in accordance with example embodiments described herein.

The indicia data capturing device 105 of FIG. 1 may include one or more components that are in electronic commutations with one another. For example, the indicia data capturing device 105 may comprise apparatus 200 shown in FIG. 2. The apparatus 200 may include a processor 210, a memory 208, a communications module 212, an imaging component 202, and an illumination component 204 that are in electronic communication with one another via a system bus 206. In some embodiments, the system bus 206 refers to a computer bus that connects these components so as to enable data transfer and communications between these components.

In some embodiments, the imaging component 202 may comprise one or more imaging sensors including, but are not limited to, a color or monochrome 1D or 2D Charge Coupled Device (CCD), Complementary Metal-Oxide-Semiconductor (CMOS), N-channel Metal-Oxide-Semiconductor (NMOS), P-channel Metal-Oxide-Semiconductor (PMOS), Charge Injection Device (CID) or Charge Modulation Device (CMD) solid state image sensor, and/or the like. In some embodiments, the imaging component 202 may define a field of view for capturing an image of indicia and generating indicia imaging data.

In some embodiments, the apparatus 200 may comprise an illumination component 204 that is configured to illuminate the field of view of the imaging component 202, so as to improve the quality of the captured indicia imaging data. In some embodiments, the illumination component 204 may include an illumination source and an illuminating optics assembly. Examples of illuminating optics assemblies may include, but are not limited to, one or more lenses, diffusers, wedges, reflectors or a combination of such elements, for directing light from illumination source in the direction of the field of view. For example, if the image of the indicia 107 shown in FIG. 1 is to be captured, the illuminating optics assembly may be configured to direct the light from the illumination source on the indicia 107. Some examples of the illumination source may include, but are not limited to, laser diodes (for example, violet laser diodes, visible laser diodes, edge-emitting laser diodes, surface-emitting laser diodes, and/or the like. Additionally, or alternatively, the illumination source may comprise one or more light-emitting diodes (LEDs). Additionally, or alternatively, the illumination source may comprise one or more other forms of natural and/or artificial sources of light.

In some embodiments, the imaging component 202 and/or the illumination component 204 may be controlled by the processor 210. For example, the processor 210 may transmit electronic instructions to the illumination component 204 via the system bus 206 to trigger the illumination component 204 to illuminate the field of view of the imaging component 202, may transmit electronic instructions to the imaging component 202 to trigger the imaging component 202 to capture indicia imaging data that include one or more images of the indicia, and may receive the indicia imaging data from the imaging component 202.

The processor 210 may be embodied in a number of different ways and may, for example, include one or more processing devices configured to perform independently. Additionally, or alternatively, the processor 210 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

For example, the processor 210 may be embodied as one or more complex programmable logic devices (CPLDs), microprocessors, multi-core processors, co-processing entities, application-specific instruction-set processors (ASIPs), and/or controllers. Further, the processor 210 may be embodied as one or more other processing devices or circuitry. The term circuitry may refer to an entirely hardware embodiment or a combination of hardware and computer program products. Thus, the processor 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 210 may be configured for a particular use or configured to execute instructions stored in volatile or non-volatile media or otherwise accessible to the processor 210. As such, whether configured by hardware or computer program products, or by a combination thereof, the processor 210 may be capable of performing steps or operations according to embodiments of the present disclosure when configured accordingly.

In an example embodiment, the processor 210 may be configured to execute instructions stored in the memory 208 or otherwise accessible to the processor. Alternatively, or additionally, the processor 210 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 210 is embodied as an executor of software instructions, the instructions may specifically configure the processor to perform the algorithms and/or operations described herein when the instructions are executed.

In some embodiments, the memory 208 may be non-transitory and may include, for example, one or more volatile and/or non-volatile memories. In other words, for example, the memory 208 may be an electronic storage device (e.g., a computer readable storage medium). The memory 208 may be configured to store information, data, content, applications, instructions, or the like, for enabling the apparatus 200 to carry out various functions in accordance with example embodiments of the present disclosure. In this regard, the memory 208 may be preconfigured to include computer-coded instructions (e.g., computer program code), and/or dynamically be configured to store such computer-coded instructions for execution by the processor 210.

In an example embodiment, the apparatus 200 further includes a communications module 212 that may enable the apparatus 200 to transmit the indicia imaging data to other devices (such as, but not limited to, the indicia data editing devices 101A, 101B, . . . , 101N as shown in FIG. 1) through a communication network. The communications module 212 may be any means such as a device or circuitry embodied in either hardware or a combination of hardware and software that is configured to receive and/or transmit data from/to a network and/or any other device, circuitry, or module in communication with the apparatus 200. In this regard, the communications module 212 may include, for example, a network interface for enabling communications with a wired or wireless communication network. For example, the communications module 212 may include one or more circuitries, network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

Some examples of the apparatus 200 may include, but are not limited to, an indicia scanner, a handheld scanner, a flatbed scanner, a camera, and/or any other device that is capable of capturing a plurality of images of the indicia and/or generating indicia imaging data of the indicia. Additionally, or alternatively, the apparatus 200 may be in other form(s) and/or may comprise other component(s).

Figure 3:
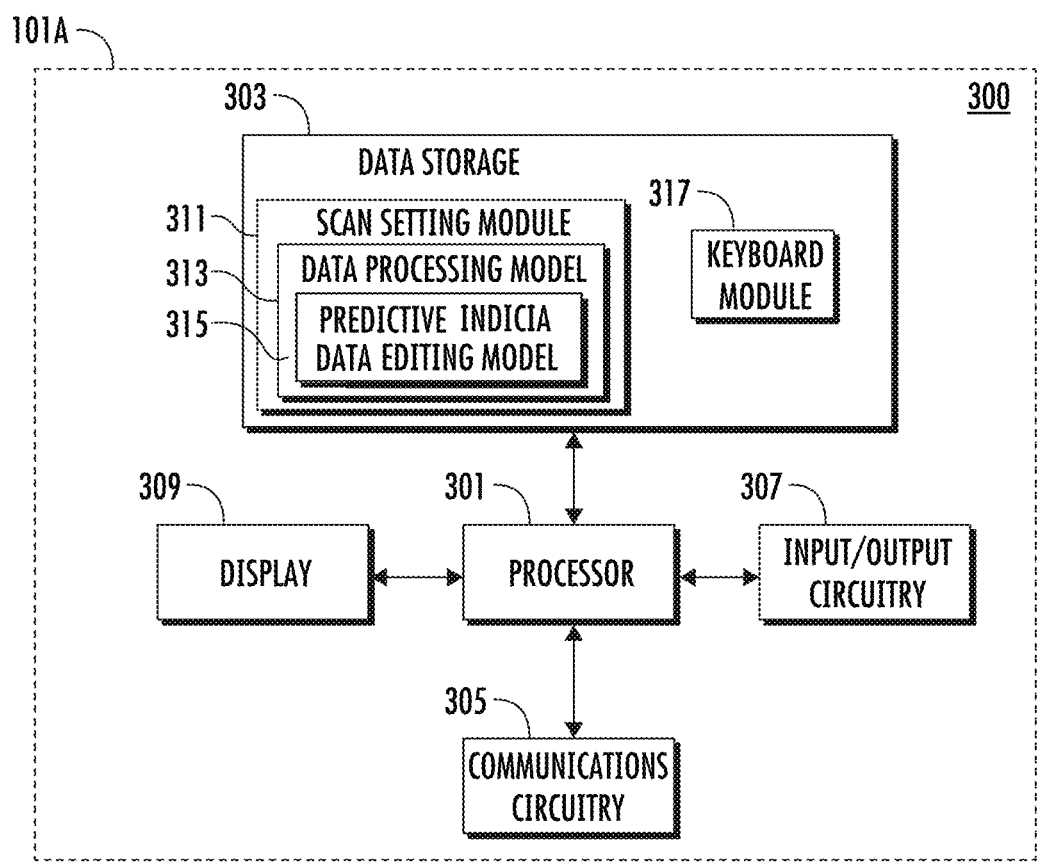
FIG. 3 illustrates an example block diagram of an example indicia data editing device in accordance with example embodiments described herein.

The indicia data editing devices 101A-101N of FIG. 1 may include one or more computing systems, such as the apparatus 300 shown in FIG. 3. The apparatus 300 may include a processor 301, a data storage 303, a communications circuitry 305, an input/output circuitry 307, and/or a display 309. The apparatus 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries.

The use of the term "circuitry" as used herein with respect to components of the apparatus should therefore be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 301 may provide processing functionality, the data storage 303 may provide storage functionality, the communications circuitry 305 may provide network interface functionality, and the like.

In one embodiment, the data storage 303 may further include or be in communication with volatile media (also referred to as volatile storage, memory, memory storage, memory circuitry and/or similar terms used herein interchangeably). In one embodiment, the volatile storage or memory may also include, such as but not limited to, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the data storage 303 may be used to store at least portions of the databases, database instances, database management system entities, data, applications, programs, program modules, scripts, source code, object code, byte code, compiled code, interpreted code, machine code, executable instructions, and/or the like being executed by, for example, the processor 301 as shown in FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the indicia data editing device 101A with the assistance of the processor 301 and operating system.

In one embodiment, the data storage 303 may further include or be in communication with non-volatile media (also referred to as non-volatile storage, memory, memory storage, memory circuitry and/or similar terms used herein interchangeably). In one embodiment, the non-data storage 303 may include, such as, but not limited to, hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the data storage 303 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

In various embodiments of the present disclosure, the data storage 303 may also be embodied as a data storage device or devices, as a separate database server or servers, or as a combination of data storage devices and separate database servers. Further, in some embodiments, data storage 303 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery system may be stored. Further, the information/data required for the operation of the recovery system may also be partially stored in the cloud data storage system and partially stored in a locally maintained data storage system. More specifically, data storage 303 may encompass one or more data stores configured to store information/data usable in certain embodiments.

In the example as shown in FIG. 3, one or more modules may be part of the data storage 303. In the present disclosure, the term "module" refers to one or more data storage units in the data storage 303 that may store executable computer program instructions. When the executable computer program instructions stored in a module are executed by a processing circuitry (such as, but not limited to, the processor 301 shown in FIG. 3), the executable computer program instructions may cause the processing circuitry to perform one or more functions. In the example shown in FIG. 3, the data storage 303 may comprise a scan setting module 311 and a keyboard module 317.

In some embodiments, the scan setting module 311 may comprise executable computer program instructions that define scan settings of one or more indicia data capturing devices (for example, the indicia data capturing device 105 shown in FIG. 1 and FIG. 2) and/or one or more indicia data editing devices (for example, the indicia data editing device 101A shown in FIG. 1 and FIG. 3). For example, the scan settings may include, but not limited to, symbology settings (which may define a symbology type of the scanned indicia), trigger settings (which may define what operation to take place when the trigger of the indicia data capturing device is activated), and/or the like.

In the example shown in FIG. 3, the scan setting module 311 may comprise a data processing model 313. In some embodiments, the data processing model 313 refers to computer program instructions stored in the scan setting module 311 that define the processing operations on the indicia imaging data. For example, the data processing model 313 may define how to decode the indicia imaging data to generate a decoded data string. As an example, the indicia imaging data may comprise one or more digital images of the indicia, and each of the one or more digital images may comprise areas with different light intensities. In some embodiments, the data processing model 313 may define one or more light intensity thresholds, and may compare the light intensities in different areas of the digital images with the light intensity thresholds to generate the decoded data string.

While the description above provides an example of generating decoded data string based on the indicia imaging data, it is noted that the scope of the present disclosure is not limited to the description above. In some examples, an example method may implement one or more additional and/or alternative steps to generate the decoded data string.

As described above, the decoded data string may not satisfy the data formatting requirements by a specific user and/or for a specific use case. In some embodiments, the data processing model 313 may further process the decoded data string to generate a predictive data string, and may transmit the predictive data string to the keyboard module.

In some embodiments, the data processing model 313 may comprise a predictive indicia data editing model 315. In some embodiments, the predictive indicia data editing model 315 refers to an artificial intelligence and/or machine learning model that programmatically determines predictive indicia data editing indications for the decoded data string, applies the predictive indicia data editing indications to the decoded data string to generate a predictive data string that satisfies the formatting requirements by the users and/or for the use cases. Additional details of generating the predictive indicia data editing model 315 are described herein, including, but not limited to, those described in connection with at least FIG. 4 to FIG. 8 herein.

As described above, the data processing model 313 may transmit processed data (such as, but not limited to, decoded data string, predictive data string) to the keyboard module 317. In some embodiments, the keyboard module 317 refers to computer program instructions stored in the data storage 303 that translate the processed data into keyboard strokes.

For example, the keyboard module 317 intercepts the processed data from the data processing model 313, and translates them into keyboard strokes. In some embodiments, the keyboard module 317 may further provide or transmit the translated keyboard strokes to the input/output circuitry 307 and/or to the processor 301. In some embodiments, data sent through the keyboard module 317 appears as if it was typed into the apparatus 300 through the input/output circuitry 307, while the input/output circuitry 307 (for example, the physical keyboard) itself remains fully functional.

In some embodiments, the apparatus 300 may execute a software application that comprises one or more input fields (for example, one or more input boxes on the user interface). In such embodiments, the keyboard module 317 may provide the processed data from the data processing model 313 as inputs to the one or more input fields.

In some embodiments, a keyboard module may additionally and/or alternatively be part of a computer or a smartphone. In such examples, the computer and/or the smartphone using the keyboard module cannot tell the difference between data that is "entered" by a scanning device (such as the indicia data capturing device and/or the indicia data editing device described herein) or data that is entered by typing on the physical keyboard. As such, the keyboard module can be used to easily add barcode reading capability to an existing device without modifying software applications.

While the description above describes examples of the scan setting module and the keyboard module as software-based applications, it is noted that the scope of the present disclosure is not limited to the description above. In some examples, examples of scan setting modules and keyboard modules may comprise hardware based elements. For example, the scan setting module may be an inserted hardware component in the indicia data capturing device and/or indicia data editing device that controls the processing operations of the decoded data string as described herein. Additionally, or alternatively, the keyboard module may be an inserted hardware component in the indicia data capturing device and/or indicia data editing device that translates processed data from the data processing model into keyboard strokes, similar to those described herein.

In some embodiments, the processor 301 (and/or co-processor or any other processing circuitry assisting or otherwise associated with the processor) may be in communication with the data storage 303 via a bus for passing information among components of the apparatus. The processor 301 may be embodied in a number of different ways and may, for example, include one or more processing devices configured to perform independently. Additionally, or alternatively, the processor 301 may include one or more processors configured in tandem via a bus to enable independent execution of instructions, pipelining, and/or multi-threading. The use of the term "processing circuitry" may be understood to include a single core processor, a multi-core processor, multiple processors internal to the apparatus, and/or remote or "cloud" processors.

For example, the processor 301 may be embodied as one or more complex programmable logic devices (CPLDs), microprocessors, multi-core processors, co-processing entities, application-specific instruction-set processors (ASIPs), and/or controllers. Further, the processor 301 may be embodied as one or more other processing devices or circuitry. The term circuitry may refer to an entirely hardware embodiment or a combination of hardware and computer program products. Thus, the processor 301 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 301 may be configured for a particular use or configured to execute instructions stored in volatile or non-volatile media or otherwise accessible to the processor 301. As such, whether configured by hardware or computer program products, or by a combination thereof, the processor 301 may be capable of performing steps or operations according to embodiments of the present disclosure when configured accordingly.

In an example embodiment, the processor 301 may be configured to execute instructions stored in the data storage 303 or otherwise accessible to the processor. Alternatively, or additionally, the processor 301 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 301 is embodied as an executor of software instructions, the instructions may specifically configure the processor to perform the algorithms and/or operations described herein when the instructions are executed.

In some embodiments, the apparatus 300 may include the input/output circuitry 307 that may, in turn, be in communication with the processor 301 to provide output to the user and, in some embodiments, to receive an indication of a user input. The input/output circuitry 307 may comprise an interface, a mobile application, a kiosk, or the like. In some embodiments, the input/output circuitry 307 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the data storage 303, and/or the like).

In some embodiments, the apparatus 300 may include the display 309 that may, in turn, be in communication with the processor 301 to display user interfaces (such as, but not limited to, predictive indicia data editing user interfaces). In various examples of the present disclosure, the display 309 may include a liquid crystal display (LCD), a light-emitting diode (LED) display, a plasma (PDP) display, a quantum dot (QLED) display, and/or the like.

The communications circuitry 305 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 305 may include, for example, a network interface for enabling communications with a wired or wireless communication network and/or in accordance with a variety of networking protocols described herein. For example, the communications circuitry 305 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Reference will now be made to FIG. 4 to FIG. 8, which provide flowcharts and diagrams illustrating example steps, processes, procedures, and/or operations in accordance with various embodiments of the present disclosure. FIG. 9A to FIG. 11C provide example views of interactive user interfaces in accordance with various embodiments of the present disclosure.

While example embodiments of the present disclosure may be described in the context of capturing data from indicia (such as, but not limited to, barcodes, QR codes, and/or the like) and editing such data, a person of ordinary skill in the relevant technology will recognize that embodiments of the present disclosure are not limited to this context only.

Various methods described herein, including, for example, example methods as shown in FIG. 4 to FIG. 8, may provide various technical benefits and improvements. It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 4 to FIG. 8 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Figure 4:
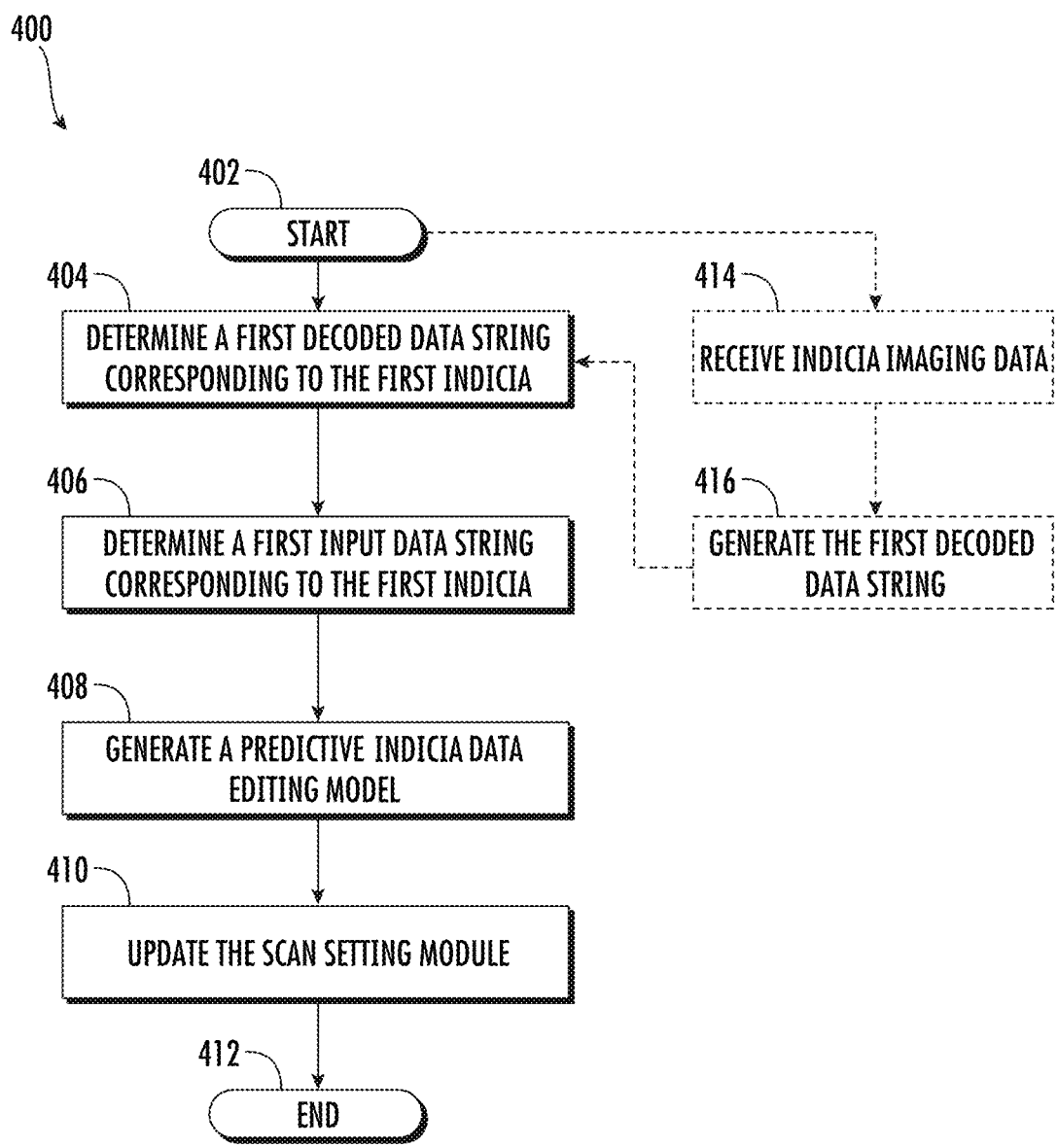
FIG. 4 is an example flowchart illustrating an example method of updating an example scan setting module in accordance with example embodiments of the present disclosure.

Referring now to FIG. 4, an example method 400 is illustrated. In some embodiments, the example method 400 may generate a predictive indicia data editing model and update a scan setting module based at least in part on the predictive indicia data editing model.

The example method 400 starts at step/operation 402. Subsequent to and/or in response to step/operation 402, the example method 400 proceeds to step/operation 404. At step/operation 404, a processor (such as, but not limited to, the processor 301 of the indicia data editing device 101A described above in connection with FIG. 1 and FIG. 3) determines a first decoded data string corresponding to the first indicia.

In some embodiments, the processor may determine the first decoded data string corresponding to a first indicia based at least in part on a data processing model associated with a scan setting module.

As described above, the scan setting module may comprise executable computer program instructions that define the scan settings of one or more indicia data capturing devices and/or one or more indicia data editing devices. In some embodiments, the scan setting module may include a data processing model that not only defines how to decode the indicia imaging data to generate a decoded data string, but also defines how to further process the decoded data string so as to satisfy the data formatting requirements by the users and/or for the specific use cases.

For example, the scan setting module may define scan settings associated with the indicia data capturing device. As described above, the indicia data capturing device may generate indicia imaging data based at least in part on capturing image data associated with indicia. The indicia data capturing device may decode the indicia imaging data based on decode settings associated with the scan setting module and/or the data processing model to generate the decoded data string.

Additionally, or alternatively, the scan setting module may define scan settings associated with the indicia data editing device. In such an example, the indicia data capturing device may transmit the indicia imaging data to the indicia data editing device, and the indicia data editing device may generate one or more decoded data strings based on the indicia imaging data. For example, prior to step/operation 404 (e.g. prior to determining the first decoded data string), the example method 400 may include one or more additional steps/operations.

In the example shown in FIG. 4, subsequent to and/or in response to step/operation 402 and prior to step/operation 404, the example method 400 may proceed to step/operation 414. At step/operation 414, a processor (such as, but not limited to, the processor 301 of the indicia data editing device 101A described above in connection with FIG. 1 and FIG. 3) receives indicia imaging data.

In some embodiments, the processor may receive indicia imaging data associated with the first indicia from an indicia data capturing device. Referring back to FIG. 1, the indicia data capturing device 105 may capture one or more images of the indicia 107, and may generate indicia imaging data based on the one or more images. In some embodiments, the indicia data capturing device 105 may transmit the indicia imaging data to the one or more indicia data editing devices 101A, 101B, . . . , 101N through the communication network 103.

Referring back to FIG. 4, subsequent to and/or in response to step/operation 414, the example method 400 proceeds to step/operation 416. At step/operation 416, a processor (such as, but not limited to, the processor 301 of the indicia data editing device 101A described above in connection with FIG. 1 and FIG. 3) generates the first decoded data string.

In some embodiments, the processor may generate the first decoded data string based at least in part on the indicia imaging data and the data processing model.

For example, the scan setting module may define scan settings associated with the indicia data editing device. As described above, the scan setting module may include a data processing model that defines how to decode the indicia imaging data to generate a decoded data string. In some embodiments, the indicia data editing device may decode the indicia imaging data based on decode settings associated with the scan setting module to generate the decoded data string.

While the description above provides an example of the indicia data editing device decoding the indicia imaging data, it is noted that the scope of the present disclosure is not limited to the description above. For example, the indicia data capturing device may generate the decoded data string based on the indicia imaging data, and may transmit the decoded data string to the indicia data editing device. Doing so may reduce the computing processing needed on the indicia data editing device while increasing the speed of generating predictive data strings that satisfy the formatting requirements by the users and/or for the use cases, as described herein.

Referring back to FIG. 4, subsequent to and/or in response to step/operation 416, the example method 400 returns to step/operation 404.

In some embodiments, subsequent to and/or in response to step/operation 404, the example method 400 proceeds to step/operation 406. At step/operation 406, a processor (such as, but not limited to, the processor 301 of the indicia data editing device 101A described above in connection with FIG. 1 and FIG. 3) determines a first input data string corresponding to the first indicia.

In some embodiments, the processor determines the first input data string corresponding to the first indicia based at least in part on user input data. For example, a user may provide input that indicates a desired data string corresponding to the first indicia. In some embodiments, the first input data string satisfies the editing/formatting requirements by the user and/or according to the use case.

As described above in connection with at least FIG. 3, an example indicia data editing device in example embodiments of the present disclosure may comprise an input/output circuitry. In some embodiments, the user input data may be generated based on the user inputs via the input/output circuitry.

In some embodiments, the first decoded data string represents the raw data and/or information that is decoded from the first indicia. As an example, the first decoded data string corresponding to the first indicia that is determined by the processor at step/operation 404 may be as follows:

ABC1234567890

Continuing this example, the first input data string determined at step/operation 406 may be as follows:

123456789Z

In some embodiments, the first input data string represents a data string that corresponds to the first indicia and satisfies the editing/formatting requirements by the user.

Referring back to FIG. 4, subsequent to and/or in response to step/operation 406, the example method 400 proceeds to step/operation 408. At step/operation 408, a processor (such as, but not limited to, the processor 301 of the indicia data editing device 101A described above in connection with FIG. 1 and FIG. 3) generates a predictive indicia data editing model.

In some embodiments, the processor generates the predictive indicia data editing model based at least in part on providing the first decoded data string that is determined at step/operation 404 and the first input data string that is determined at step/operation 406 to an artificial intelligence algorithm.

In some embodiments, the predictive indicia data editing model defines at least one predictive indicia data editing indication. In some embodiments, the at least one predictive indicia data editing indication comprises at least one predictive editing applicability indication and at least one predictive editing operation indication.

In some embodiments, the at least one predictive editing operation indication defines at least one indicia data editing operation based on the first decoded data string and the first input data string. For example, the at least one indicia data editing operation defines how to transform the decoded data string into the input data string.

Continuing from the example above where the first decoded data string is "ABC1234567890" and the first input data string is "123456789Z," the predictive indicia data editing model may define the following predictive editing operation indications:

1. Remove all first 3 digits; and
2. Change the last digit to "Z".

In some embodiments, the predictive indicia data editing model defines at least one predictive editing applicability indication. For example, the at least one predictive editing applicability indication defines at least one characteristic requirement based on the first decoded data string. For example, the at least one predictive editing applicability indication defines what characteristic of the decoded data string is required for the predictive indicia data editing model to be applied on the decoded data string.

Continuing from the example above where the first decoded data string is "ABC1234567890" and the first input data string is "123456789Z," the predictive indicia data editing model may define the following predictive editing applicability indications:

1. Apply to CODE 128; and
2. Apply to LENGTH=13.

As described above, the processor may generate the predictive indicia data editing model based at least in part on providing the first decoded data string and the first input data string to an artificial intelligence algorithm.

In some embodiments, the artificial intelligence algorithm comprises at least one pattern matching algorithm or pattern recognition algorithm. For example, the artificial intelligence algorithm comprises at least one regular expression algorithm. The regular expression algorithm may, for example, conduct pattern searching in the decoded data string to identify patterns in the decoded data string so as to generate the predictive editing applicability indication. Additionally, or alternatively, the regular expression algorithm may conduct pattern searching in both the first decoded data string and the first input data string, determine similarities and differences between patterns in the first decoded data string and patterns in the first input data string, and generate the at least one predictive editing operation indication based at least in part on the similarities and differences.

While the description above provides an example of a regular expression algorithm as an example of the artificial intelligence algorithm that is used to generate the predictive indicia data editing model, it is noted that the scope of the present disclosure is not limited to the description above. In some examples, one or more additional and/or alternative artificial intelligence algorithms may be utilized to generate the predictive indicia data editing model.

For example, various embodiments of the present disclosures may implement artificial intelligence and/or machine learning algorithms that include, but are not limited to, Linear Regression algorithm, Logistic Regression algorithm, Decision Tree algorithm, support vector machine (SVM) algorithm, Naive Bayes algorithm, k-nearest neighbors (KNN) algorithm, K-Means algorithm, Random Forest algorithm, recurrent neural network (RNN) algorithm, generative adversarial network (GAN) algorithm, artificial neural network, and/or the like, to generate the predictive indicia data editing model.

While the description above provides an example of training the artificial intelligence and/or machine learning algorithms based on the first decoded data string and the first input data string, it is noted that the scope of the present disclosure is not limited to the description above. In some examples, an example method may train the artificial intelligence and/or machine learning algorithms based on, for example but not limited to, training dataset that include a plurality of decoded data strings and a plurality of input data strings.

Referring back to FIG. 4, subsequent to and/or in response to step/operation 408, the example method 400 proceeds to step/operation 410. At step/operation 410, a processor (such as, but not limited to, the processor 301 of the indicia data editing device 101A described above in connection with FIG. 1 and FIG. 3) updates the scan setting module.

In some embodiments, the processor may update the scan setting module based at least in part on the predictive indicia data editing model. For example, the processor may update the data processing model of the scan setting module so as to include the predictive indicia data editing model generated at step/operation 408. In such an example, the data processing model may include the at least one predictive editing applicability indication and the at least one predictive editing operation indication of the predictive indicia data editing model.

In some embodiments, the data processing model may apply the at least one predictive editing operation indication on future decoded data strings that satisfy the at least one predictive editing applicability indication to generate predictive data strings. In some embodiments, the data processing model may transmit the predictive data strings to a keyboard module.

Continuing from the example above, the processor may determine a second decoded data string as follows:
ABC1234567880

In this example, the processor may determine that the second decoded data string satisfies the at least one predictive editing applicability indication (e.g. the second decoded data string is based on CODE 128 and has a length of 13 characters). The processor may apply the at least one predictive editing operation indication (remove all first 3 digits and change the last digit to "Z") on the second decoded data string, and generates the following predictive data string:
123456788Z In some embodiments, the processor may transmit the predictive data string to a keyboard module.

As described above, the scan setting module may comprise executable computer program instructions that define the scan settings of one or more indicia data capturing devices (for example, the indicia data capturing device 105 shown in FIG. 1) and/or one or more indicia data editing devices (for example, the indicia data editing device 101A shown in FIG. 1 and FIG. 3). In various embodiments of the present disclosure, decoding the indicia imaging data to generate a decoded data string and/or generating a predictive data string based on the decoded data string may be carried out by the indicia data capturing device, by the indicia data editing device, and/or by a combination of indicia data capturing device and indicia data editing device.

For example, the scan setting module may define the scan settings of an indicia data capturing device. In some embodiments, the indicia data capturing device may load the updated scan setting module, may capture indicia imaging data that is associated with an indicia, may generate a decoded data string based on the indicia imaging data, and may process the decoded data string based on the predictive indicia data editing model to generate the predictive data string.

Additionally, or alternatively, the indicia data capturing device may capture indicia imaging data that is associated with an indicia and may generate a decoded data string based on the indicia imaging data and the scan setting module. In some embodiments, the indicia data capturing device may transmit the decoded data string to an indicia data editing device, and the indicia data editing device may process the decoded data string based on the predictive indicia data editing model to generate a predictive data string.

Additionally, or alternatively, the indicia data capturing device may capture indicia imaging data that is associated with an indicia and transmit the indicia imaging data to an indicia data editing device. In some embodiments, the indicia data editing device may generate a decoded data string based on the indicia imaging data and the scan setting module. In some embodiments, the indicia data editing device may process the decoded data string based on the predictive indicia data editing model to generate a predictive data string.

Referring back to FIG. 4, subsequent to and/or in response to step/operation 410, the example method 400 proceeds to step/operation 412 and ends.

While the description above provides an example method of generating a predictive indicia data editing model and updating the scan setting module based at least in part on the predictive indicia data editing model, it is noted that the scope of the present disclosure is not limited to the description above. In some examples, an example method may comprise one or more additional and/or alternative steps/operations. For example, subsequent to generating the predictive indicia data editing model, various embodiments of the present disclosure may provide an AI based data editor interface (for example, but not limited to, a predictive indicia data editing user interface) to confirm the learned logic of data editing with users (for example, but not limited to, to confirm the at least one predictive indicia data editing indication of the predictive indicia data editing model) before applying the learned logic of data editing on future data received by scanning indicia.

Figure 5:
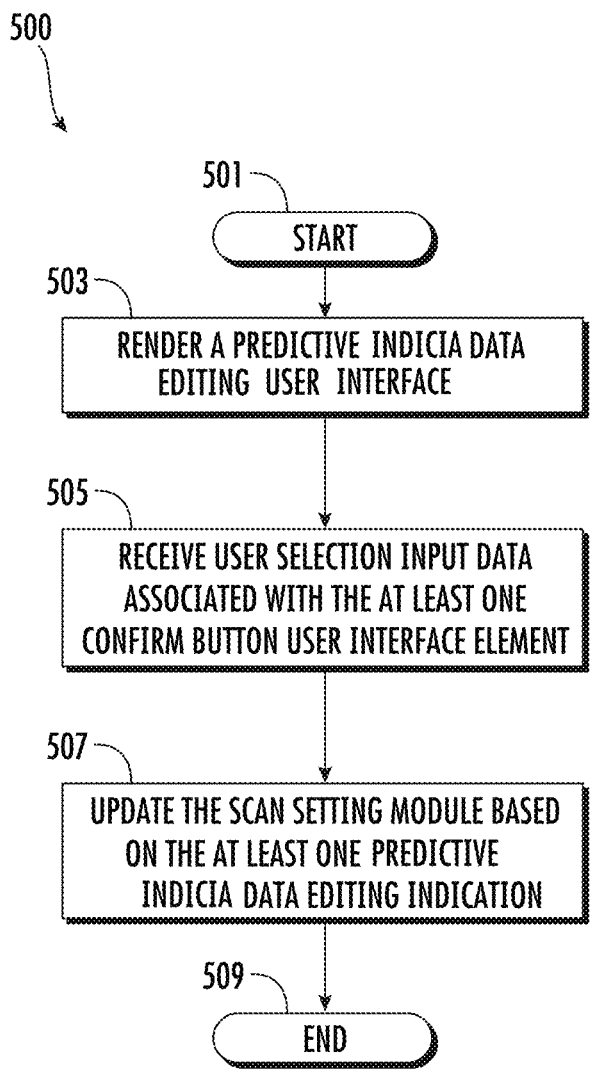
FIG. 5 is an example flowchart illustrating an example method of updating an example scan setting module in accordance with example embodiments of the present disclosure.

For example, referring now to FIG. 5, an example method 500 is illustrated. In some embodiments, the example method 500 may be implemented prior to updating the scan setting module (for example, prior to step/operation 410 of FIG. 4). For example, the example method 500 describes updating the scan setting model in response to receiving a user selection input data associated with the at least one confirm button user interface element on the predictive indicia data editing user interface.

The example method 500 starts at step/operation 501. Subsequent to and/or in response to step/operation 501, the example method 500 proceeds to step/operation 503. At step/operation 503, a processor (such as, but not limited to, the processor 301 of the indicia data editing device 101A described above in connection with FIG. 1 and FIG. 3) renders a predictive indicia data editing user interface.

In the present disclosure, the term "predictive indicia data editing user interface" refers to a user interface that is rendered on a display of an indicia data editing device that provides AI-based indicia data editing.

For example, as described above in connection with at least FIG. 4, various embodiments of the present disclosure may generate a predictive indicia data editing model based at least in part on an AI algorithm. As described above, the predictive indicia data editing model defines at least one predictive indicia data editing indication. In some embodiments, the processor may generate at least one predictive indicia data editing user interface element on the predictive indicia data editing user interface that corresponds to and is based on the at least one predictive indicia data editing indication.

In some embodiments, at least one predictive indicia data editing indication comprises at least one predictive editing applicability indication and at least one predictive editing operation indication. As an example, the predictive indicia data editing model may define the following predictive editing operation indications:

1. Remove all first 3 digits; and
2. Change the last digit to "Z".

The predictive indicia data editing model may also define the following predictive editing applicability indications:

1. Apply to CODE 128; and
2. Apply to LENGTH=13.

In this example, the processor may generate a predictive indicia data editing user interface element for each of the predictive editing operation indications and for each of the predictive editing applicability indications. For example, the predictive indicia data editing user interface element may comprise texts that describe the corresponding predictive editing operation indication and/or the corresponding predictive editing applicability indication.

In some embodiments, the processor may generate additional user interface elements that allow a user to confirm or edit the at least one predictive indicia data editing indication. For example, the processor may generate at least one confirm button user interface element corresponding to the at least one predictive indicia data editing user interface element, as well as at least one edit button user interface element corresponding to the at least one predictive indicia data editing user interface element. In some embodiments, the confirm button user interface elements and the edit button user interface elements may be in the form of user selectable buttons on the user interface.

In some embodiments, when the user clicks, taps or otherwise selects the at least one confirm button user interface element, the processor may receive user selection input data associated with the at least one confirm button user interface element that indicates a user confirmation of the at least one predictive indicia data editing indication. In some embodiments, when the user clicks, taps or otherwise selects the at least one edit button user interface element, the processor may receive user selection input data associated with the at least one edit button user interface element that indicates a user request to edit the at least one predictive indicia data editing indication.

Continuing from the example above, the processor may generate a confirm button user interface element and an edit button user interface element for each of the predictive indicia data editing user interface elements. In some embodiments, the confirm button user interface element and the edit button user interface element may be positioned adjacent to the corresponding predictive indicia data editing user interface element. Examples are illustrated in at least FIG. 11B and FIG. 11C.

Referring back to FIG. 5, subsequent to and/or in response to step/operation 503, the example method 500 proceeds to step/operation 505. At step/operation 505, a processor (such as, but not limited to, the processor 301 of the indicia data editing device 101A described above in connection with FIG. 1 and FIG. 3) receives user selection input data associated with the at least one confirm button user interface element.

In some embodiments, when the user clicks, taps or otherwise selects the at least one confirm button user interface element, the processor may receive user selection input data associated with the at least one confirm button user interface element that indicates a user confirmation of the at least one predictive indicia data editing indication. For example, the user selection input data may indicate that the user confirms and/or approves the at least one predictive indicia data editing indication associated with the at least one predictive indicia data editing user interface element that is positioned adjacent to the at least one confirm button user interface element.

Referring back to FIG. 5, subsequent to and/or in response to step/operation 505, the example method 500 proceeds to step/operation 507. At step/operation 507, a processor (such as, but not limited to, the processor 301 of the indicia data editing device 101A described above in connection with FIG. 1 and FIG. 3) updates the scan setting module based at least in part on the at least one predictive indicia data editing indication.

In some embodiments, the processor updates the scan setting module in response to receiving the user selection input data associated with the at least one confirm button user interface element at step/operation 505.

For example, in response to receiving the user selection input data, the processor determines that the user confirms and/or approves the corresponding predictive indicia data editing indication defined by the predictive indicia data editing model. In some embodiments, the processor may update the scan setting module to include the corresponding predictive indicia data editing indication, similar to those described above in connection with at least step/operation 410 of FIG. 4.

Referring back to FIG. 5, subsequent to and/or in response to step/operation 507, the example method 500 proceeds to step/operation 509 and ends.

Figure 6:
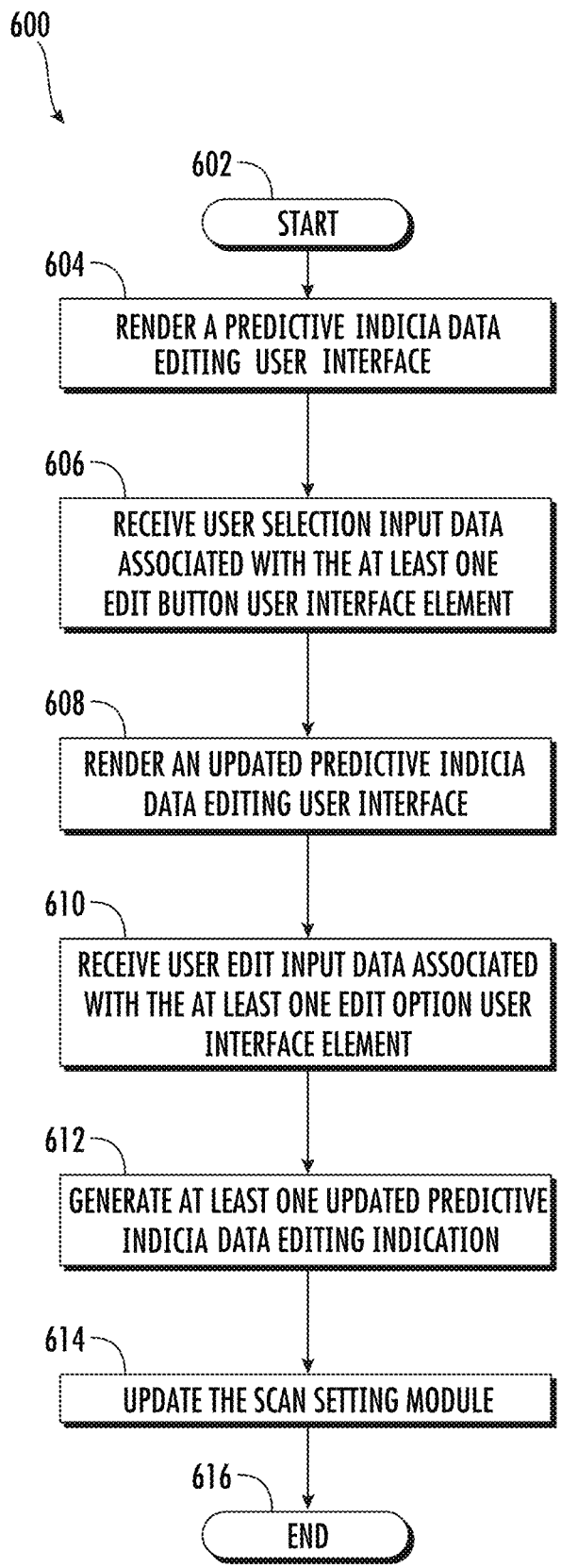
FIG. 6 is an example flowchart illustrating an example method of updating an example scan setting module in accordance with example embodiments of the present disclosure.

Referring now to FIG. 6, an example method 600 is illustrated. In some embodiments, the example method 600 may be implemented prior to updating the scan setting module (for example, prior to step/operation 410 of FIG. 4). For example, the example method 600 describes updates the scan setting model based on receiving user edit input data associated with the at least one edit option user interface element on the predictive indicia data editing user interface.

The example method 600 starts at step/operation 602. Subsequent to and/or in response to step/operation 602, the example method 600 proceeds to step/operation 604. At step/operation 604, a processor (such as, but not limited to, the processor 301 of the indicia data editing device 101A described above in connection with FIG. 1 and FIG. 3) renders a predictive indicia data editing user interface.

In some embodiments, the processor may render the predictive indicia data editing user interface similar to those described above in connection with at least step/operation 503 of FIG. 5.

Referring back to FIG. 6, subsequent to and/or in response to step/operation 604, the example method 600 proceeds to step/operation 606. At step/operation 606, a processor (such as, but not limited to, the processor 301 of the indicia data editing device 101A described above in connection with FIG. 1 and FIG. 3) receives user selection input data associated with the at least one edit button user interface element.

In some embodiments, when the user clicks, taps or otherwise selects the at least one edit button user interface element, the processor may receive user selection input data associated with the at least one edit button user interface element that indicates a user request to edit the at least one predictive indicia data editing indication. For example, the user selection input data may indicate that the user requests to edit the at least one predictive indicia data editing indication associated with the at least one predictive indicia data editing user interface element that is positioned adjacent to the at least one edit button user interface element.

Referring back to FIG. 6, subsequent to and/or in response to step/operation 606, the example method 600 proceeds to step/operation 608. At step/operation 608, a processor (such as, but not limited to, the processor 301 of the indicia data editing device 101A described above in connection with FIG. 1 and FIG. 3) renders an updated predictive indicia data editing user interface.

In some embodiments, the processor renders an updated predictive indicia data editing user interface in response to receiving the user selection input data at step/operation 606. In some embodiments, the updated predictive indicia data editing user interface comprises at least one edit option user interface element.

As described above, the user selection input data associated with the at least one edit button user interface element indicates a user request to edit or change the corresponding predictive indicia data editing indication. In such an example, the at least one edit option user interface element on the updated predictive indicia data editing user interface may display edit options associated with the corresponding predictive indicia data editing indication.

For example, the processor may receive user selection input data associated with an edit button user interface element that is positioned adjacent to a predictive indicia data editing user interface element corresponding to a predictive editing applicability indication associated with the symbology type. In such an example, the processor may render an updated predictive indicia data editing user interface that includes an edit option user interface element in the form of a drop-down menu user interface element. The drop-down menu user interface element may include options such as, but not limited to, Code 11, Code 128/ISBT 128, Codebar, Codeblock F, and/or the like.

Referring back to FIG. 6, subsequent to and/or in response to step/operation 608, the example method 600 proceeds to step/operation 610. At step/operation 610, a processor (such as, but not limited to, the processor 301 of the indicia data editing device 101A described above in connection with FIG. 1 and FIG. 3) receives user edit input data associated with the at least one edit option user interface element.

In some embodiments, the user edit input data can be associated with one of the options displayed in the at least one edit option user interface element. Continuing from the example above, the processor may receive user edit input data associated with one of the options displayed in the drop-down menu user interface element. For example, the user may click, tap, and/or other select the option for Code 128/ISBT 128.

While the description above provides an example of the edit option user interface element in the form of a drop-down menu user interface element, it is noted that the scope of the present disclosure is not limited to the description above. In some examples, an example edit option user interface element may comprise one or more additional and/or alternative elements. For example, an example edit option user interface element may comprise an input box, a button (including text buttons, radio buttons, toggle buttons), and/or the like.

Referring back to FIG. 6, subsequent to and/or in response to step/operation 610, the example method 600 proceeds to step/operation 612. At step/operation 612, a processor (such as, but not limited to, the processor 301 of the indicia data editing device 101A described above in connection with FIG. 1 and FIG. 3) generates at least one updated predictive indicia data editing indication.

In some embodiments, the processor may generate the at least one updated predictive indicia data editing indication based at least in part on the at least one predictive indicia data editing indication, as well as the user edit input data received at step/operation 610. For example, the processor may change, adjust and/or revise the at least one predictive indicia data editing indication based at least in part on the user edit input data received at step/operation 610.

Continuing from the example above, in response to receiving the user edit input data that indicates the user has clicked, tapped, and/or other selected the option for Code 128/ISBT 128, the processor may generate an updated predictive editing applicability indication on the symbology type to indicate Code 128/ISBT 128.

Referring back to FIG. 6, subsequent to and/or in response to step/operation 612, the example method 600 proceeds to step/operation 614. At step/operation 614, a processor (such as, but not limited to, the processor 301 of the indicia data editing device 101A described above in connection with FIG. 1 and FIG. 3) updates the scan setting module.

In some embodiments, the processor may update the scan setting module based at least in part on the at least one updated predictive indicia data editing indication that is generated at step/operation 612.

For example, subsequent to generating the at least one updated predictive indicia data editing indication, the processor may update the scan setting module to include the at least one updated predictive indicia data editing indication, similar to those described above in connection with at least step/operation 410 of FIG. 4.

Referring back to FIG. 6, subsequent to and/or in response to step/operation 614, the example method 600 proceeds to step/operation 616 and ends.

Figure 7:
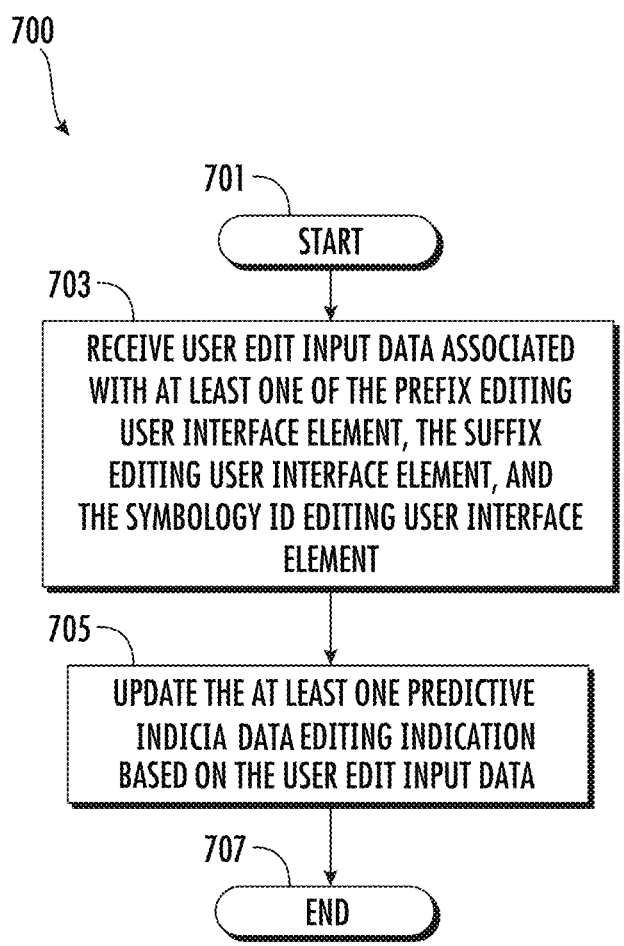
FIG. 7 is an example flowchart illustrating an example method of updating at least one example predictive indicia data editing indication in accordance with example embodiments of the present disclosure.

Referring now to FIG. 7, an example method 700 is illustrated. In some embodiments, the example method 700 may be implemented prior to updating the scan setting module (for example, prior to step/operation 410 of FIG. 4). For example, the example method 700 describes updating the scan setting model based on receiving user edit input data associated with at least one of a prefix editing user interface element, a suffix editing user interface element, and/or a symbology ID editing user interface element.

The example method 700 starts at step/operation 701. Subsequent to and/or in response to step/operation 701, the example method 700 proceeds to step/operation 703. At step/operation 703, a processor (such as, but not limited to, the processor 301 of the indicia data editing device 101A described above in connection with FIG. 1 and FIG. 3) receives user edit input data associated with at least one of the prefix editing user interface element, the suffix editing user interface element, and/or the symbology ID editing user interface element.

In some embodiments, the processor may render one or more user interface elements on the predictive indicia data editing user interface that allow users to add and/or define predictive indicia data editing indications (including predictive editing applicability indications and predictive editing operation indications), in addition to the at least one predictive indicia data editing indication defined by the predictive indicia data editing model.

For example, the processor may render the predictive indicia data editing user interface that comprises at least one of a prefix editing user interface element, a suffix editing user interface element, and/or a symbology ID editing user interface element.

In some embodiments, the prefix editing user interface element refers to an user interface element that allows a user to add a prefix to the predictive data string. For example, the prefix editing user interface element may be in the form of a drop-down menu, an input box, a button (including text buttons, radio buttons, toggle buttons), and/or the like.

Additionally, or alternatively, the suffix editing user interface element refers to an user interface element that allows a user to add a suffix to the predictive data string. For example, the suffix editing user interface element may be in the form of a drop-down menu, an input box, a button (including text buttons, radio buttons, toggle buttons), and/or the like.

Additionally, or alternatively, the symbology ID editing user interface element refers to a user interface element that allows a user to add or define a symbology ID to the predictive data string. In some embodiments, the symbology ID may uniquely identify the predictive data string. For example, the symbology ID editing user interface element may be in the form of a drop-down menu, an input box, a button (including text buttons, radio buttons, toggle buttons), and/or the like.

In some embodiments, the processor receives user edit input data associated with the at least one of the prefix editing user interface element, the suffix editing user interface element, and/or the symbology ID editing user interface element.

For example, the processor may receive user edit input data associated with the prefix editing user interface element that indicates a user request to add a prefix to the predictive data string. In some embodiments, the user edit input data may further comprise the prefix to be added to the predictive data string.

Additionally, or alternatively, the processor may receive user edit input data associated with the suffix editing user interface element that indicates a user request to add a suffix to the predictive data string. In some embodiments, the user edit input data may further comprise the suffix to be added to the predictive data string.

Additionally, or alternatively, the processor may receive user edit input data associated with the symbology ID editing user interface element that indicates a user request to add or define a symbology ID to the predictive data string. In some embodiments, the user edit input data may further comprise the symbology ID to be added or defined for the predictive data string.

Referring back to FIG. 7, subsequent to and/or in response to step/operation 703, the example method 700 proceeds to step/operation 705. At step/operation 705, a processor (such as, but not limited to, the processor 301 of the indicia data editing device 101A described above in connection with FIG. 1 and FIG. 3) updates the at least one predictive indicia data editing indication based at least in part on the user edit input data received at step/operation 703.

For example, in response to receiving user edit input data associated with the prefix editing user interface element, the processor may add, to the predictive indicia data editing model, one or more predictive indicia data editing indications (for example, predictive editing operation indications) that define an indicia data editing operation to add the prefix to the predictive data string based on the user edit input data.

Additionally, or alternatively, in response to receiving user edit input data associated with the suffix editing user interface element, the processor may add, to the predictive indicia data editing model, one or more predictive indicia data editing indications (for example, predictive editing operation indications) that define an indicia data editing operation to add the suffix to the predictive data string based on the user edit input data.

Additionally, or alternatively, in response to receiving user edit input data associated with the symbology ID user interface element, the processor may add, to the predictive indicia data editing model, one or more predictive indicia data editing indications (for example, predictive editing operation indications) that define an indicia data editing operation to add and/or define the symbology ID for the predictive data string based on the user edit input data.

In some embodiments, the processor may update the scan setting module based at least in part on the added predictive indicia data editing indication(s), similar to those described above in connection with at least step/operation 410 of FIG. 4.

Referring back to FIG. 7, subsequent to and/or in response to step/operation 705, the example method 700 proceeds to step/operation 707 and ends.

Figure 8:
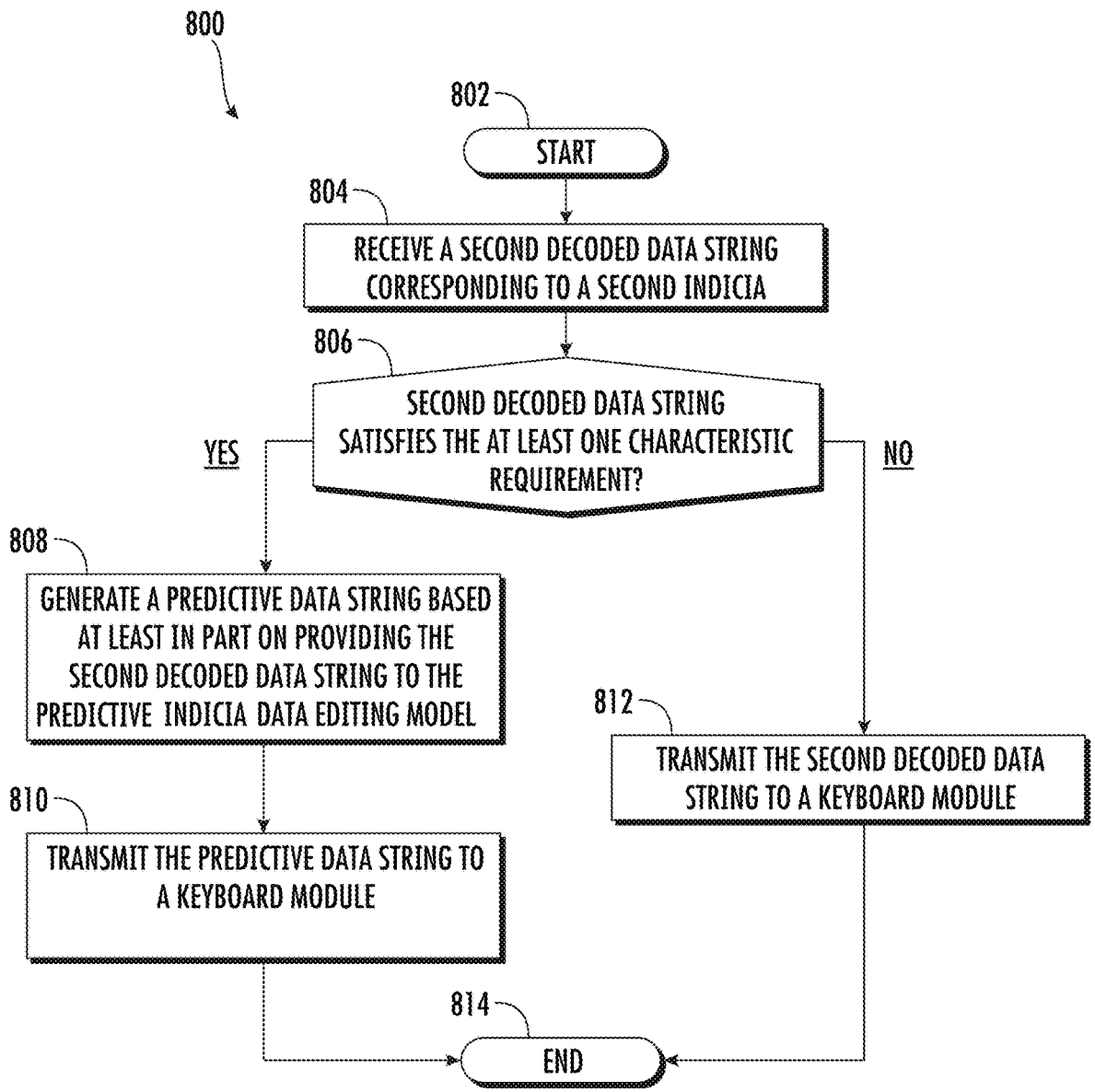
FIG. 8 is an example flowchart illustrating an example method of processing an example decoded data string in accordance with example embodiments of the present disclosure.

Referring now to FIG. 8, an example method 800 is illustrated. In some embodiments, the example method 800 may be implemented after a predictive indicia data editing model is generated in accordance with various embodiments of the present disclosure. The example method 800 illustrates determining whether to apply the predictive indicia data editing model on a decoded data string.

The example method 800 starts at step/operation 802. Subsequent to and/or in response to step/operation 802, the example method 800 proceeds to step/operation 804. At step/operation 804, a processor (such as, but not limited to, the processor 301 of the indicia data editing device 101A described above in connection with FIG. 1 and FIG. 3) receives a second decoded data string corresponding to a second indicia.

In some embodiments, the processor may receive the second decoded data string similar to those described above in connection with at least step/operation 404 of FIG. 4.

Referring back to FIG. 8, subsequent to and/or in response to step/operation 804, the example method 800 proceeds to step/operation 806. At step/operation 806, a processor (such as, but not limited to, the processor 301 of the indicia data editing device 101A described above in connection with FIG. 1 and FIG. 3) determines whether the second decoded data string satisfies the at least one characteristic requirement.

For example, as described above in connection with at least FIG. 4, the predictive indicia data editing model may comprise at least one predictive indicia data editing indication. In some embodiments, the at least one predictive indicia data editing indication may comprise at least one predictive editing applicability indication. In some embodiments, the at least one predictive editing applicability indication may define at least one characteristic requirement for applying the predictive indicia data editing model.

As an example, the predictive indicia data editing model may define the following predictive editing applicability indications:

1. Apply to CODE 128; and
2. Apply to LENGTH=13.

In this example, the processor may determine whether the second decoded data string received at step/operation 804 satisfies the predictive editing applicability indications (e.g. whether the second decoded data string satisfies the characteristic requirements defined by the predictive editing applicability indications).

In some embodiments, the processor may determine that the second decoded data string satisfies the characteristic requirements defined by the predictive editing applicability indications if the second decoded data string meets all the characteristic requirements. Continuing from the example above, if the second decoded data string is based on Code 128 and has a length of 13 characters, the processor determines that the second decoded data string satisfies the at least one characteristic requirement at step/operation 806.

In some embodiments, the processor may determine that the second decoded data string does not satisfy the characteristic requirements defined by the predictive editing applicability indications if the second decoded data string does not meet all the characteristic requirements. For example, if the second decoded data string is not based on CODE 128 and/or if the second decoded data string has a length of less than or more than 13 characters, the processor determines that the second decoded data string does not satisfy the at least one characteristic requirement at step/operation 806.

If, at step/operation 806, the processor determines that the second decoded data string satisfies the at least one characteristic requirement, the example method 800 proceeds to step/operation 808. At step/operation 808, a processor (such as, but not limited to, the processor 301 of the indicia data editing device 101A described above in connection with FIG. 1 and FIG. 3) generates a predictive data string based at least in part on providing the second decoded data string to the predictive indicia data editing model.

For example, in response to determining that the second decoded data string satisfies the at least one characteristic requirement, the processor generates a predictive data string based at least in part on providing the second decoded data string to the predictive indicia data editing model.

As described above in connection with at least FIG. 4, the predictive indicia data editing model may comprise at least one predictive indicia data editing indication. In some embodiments, the at least one predictive indicia data editing indication may comprise and at least one predictive editing operation indication. In some embodiments, the at least one predictive editing operation indication may define at least one indicia data editing operation.

Continuing from the example above, the predictive indicia data editing model may define the following predictive editing operation indication:

1. Remove all first 3 digits; and
2. Change the last digit to "Z"

In such an example, the processor may generate the predictive data string by removing all first 3 digits from the second decoded data string, and changing the last digit of the second decoded data string to "Z."

Referring back to FIG. 8, subsequent to and/or in response to step/operation 808, the example method 800 proceeds to step/operation 810. At step/operation 810, a processor (such as, but not limited to, the processor 301 of the indicia data editing device 101A described above in connection with FIG. 1 and FIG. 3) transmits the predictive data string to a keyboard module.

In some embodiments, the keyboard module may translate the predictive data string into keyboard strokes. For example, the keyboard module may provide the predictive data string as an input string to an input/output component to a computing device (such as, but not limited to, the input/output circuitry 307 of the indicia data editing device 101A shown above in connection with at least FIG. 1 and FIG. 3).

In some embodiments, the computing device may cause the predictive data string to be provided as an input on a user interface. For example, the computing device may render an user interface that comprises an input user interface element (such as, but are not limited to, an input box). In some embodiments, upon receiving the predictive data string from the keyboard module, the computing device may provide the predictive data string as an input to the input user interface element.

Referring back to FIG. 8, subsequent to and/or in response to step/operation 810, the example method 800 proceeds to step/operation 814 and ends.

If, at step/operation 806, the processor determines that the second decoded data string does not satisfy the at least one characteristic requirement, the example method 800 proceeds to step/operation 812. At step/operation 812, a processor (such as, but not limited to, the processor 301 of the indicia data editing device 101A described above in connection with FIG. 1 and FIG. 3) transmits the second decoded data string to a keyboard module.

For example, in response to determining that the second decoded data string does not satisfy the at least one characteristic requirement, the processor determines that the second decoded data string does not satisfy the requirement for applying the predictive indicia data editing model. For example, the indicia corresponding to the second decoded data string may be associated with a different user and/or for a different use case. In such an example, the processor may provide the second decoded data string to the keyboard module (instead of generating a predictive data string).

In some embodiments, the keyboard module may translate the second decoded data string into keyboard strokes. For example, the keyboard module may provide the second decoded data string as an input string to an input/output component to a computing device (such as, but not limited to, the input/output circuitry 307 of the indicia data editing device 101A shown above in connection with at least FIG. 1 and FIG. 3).

In some embodiments, the computing device may cause the second decoded data string to be provided as an input on a user interface. For example, the computing device may render an user interface that comprises an input user interface element (such as, but are not limited to, an input box). In some embodiments, upon receiving the second decoded data string from the keyboard module, the computing device may provide the second decoded data string as an input to the input user interface element.

Referring back to FIG. 8, subsequent to and/or in response to step/operation 812, the example method 800 proceeds to step/operation 814 and ends.

Referring now to FIG. 9A to FIG. 10B, example user interfaces in accordance with various embodiments of the present disclosure are illustrated. In particular, FIG. 9A to FIG. 10B illustrate different operations of triggering rendering a predictive indicia data editing user interface on a display of a computing device in accordance with various embodiments of the present disclosure.

As described above, various embodiments of the present disclosure may be configured in various forms. For example, some embodiments of the present disclosure may be configured as a software plugin (for example, a Data Editor AI plugin for mobile devices) that can be installed in a computing device. In such an example, the software plugin may update the settings of the computing device (for example, to provide various features described herein). In some embodiments, once the software plugin is installed on a computing device, the computing device becomes an indicia data editing device described herein.

Referring now to FIG. 9A to FIG. 9D, example user interfaces are illustrated. The example user interfaces may be rendered to a display of a computing device that has installed the software plugin described above.

In some embodiments, in order to trigger rendering of a predictive indicia data editing user interface in accordance with various embodiments of the present disclosure, the user may operate the computing device to navigate to the user interface 900A. In the example shown in FIG. 9A, the user interface 900A may be an application listing user interface that comprises user interface elements corresponding to software applications installed on the computing device. In particular, the user interface 900A may comprise a user interface icon 901 that corresponds to a setting application of the computing device. In this example, the setting application may define and/or specify one or more settings associated with the computing device.

Figure 9B:
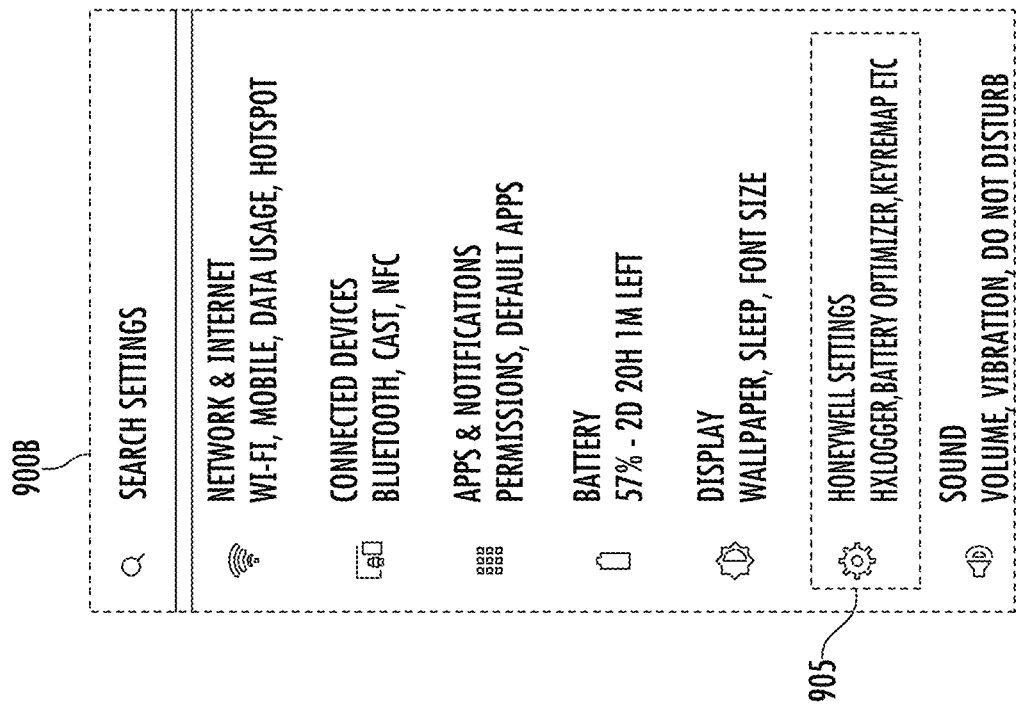
FIG. 9B illustrates an example user interface that is rendered on a display in accordance with example embodiments of the present disclosure.
Figure 9A:
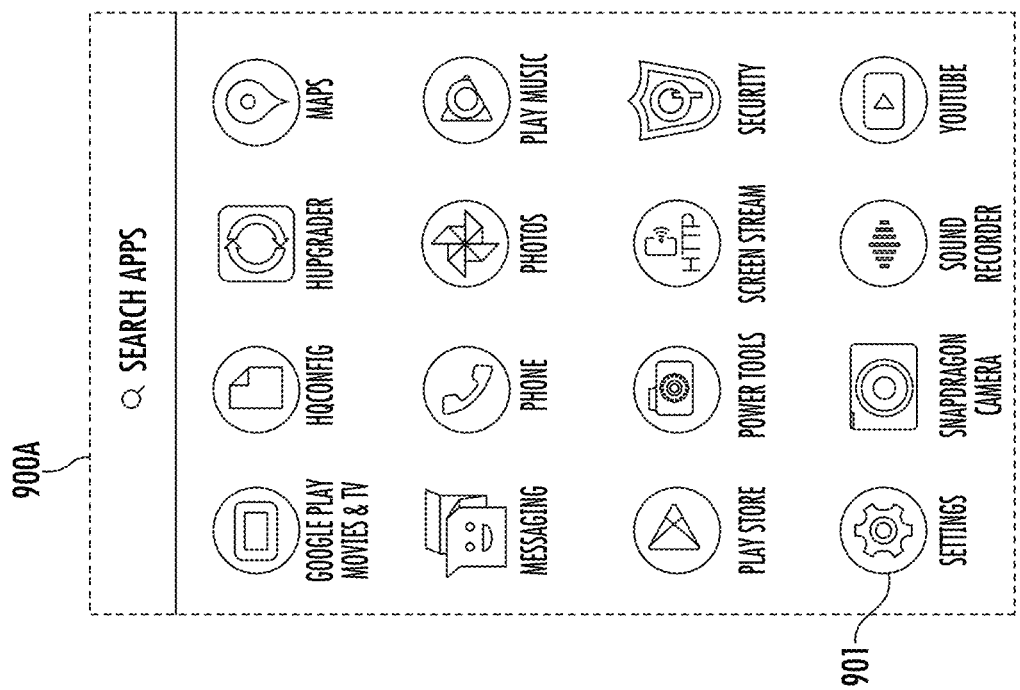
FIG. 9A illustrates an example user interface that is rendered on a display in accordance with example embodiments of the present disclosure.

In some embodiments, when a user clicks, taps and/or otherwise selects the user interface icon 901, the user interface 900A may be updated to the user interface 900B shown in FIG. 9B.

In the example shown in FIG. 9B, the user interface 900B may comprise a general setting user interface that comprises user interface elements corresponding to settings of the computing device. In some embodiments, the general setting user interface may comprise one or more user interface elements that correspond to settings for operations and/or features of the computing device. For example, the user interface 900B may comprise an indicia data capturing and editing option user interface element 905 that allows users to view settings associated with indicia data capturing and editing.

In some embodiments, when a user clicks, taps and/or otherwise selects indicia data capturing and editing option user interface element 905, the user interface 900B may be updated to the user interface 900C shown in FIG. 9C.

In the example shown in FIG. 9C, the user interface 900C may comprise an indicia data capturing and editing setting user interface that comprises user interface elements corresponding to indicia data capturing and editing settings. For example, the user interface 900C may comprise a scan setting option user interface element 909 that allows users to view settings associated with the scan setting module described herein.

In some embodiments, when a user clicks, taps and/or otherwise selects scan setting option user interface element 909, the user interface 900C may be updated to the user interface 900D shown in FIG. 9D.

In the example shown in FIG. 9D, the user interface 900D may comprise a scan setting module user interface that comprises user interface elements corresponding to different options associated with the scan setting module. For example, the user interface 900D may comprise an AI data editing option user interface element 911 that allows users to trigger rendering a predictive indicia data editing user interface in accordance with various examples described herein.

In some embodiments, when a user clicks, taps and/or otherwise selects the AI data editing option user interface element 911, the user interface 900D may be updated to include a predictive indicia data editing user interface (for example, but not limited to, those illustrated in connection with at least FIG. 11A to FIG. 11C).

Figure 10B:
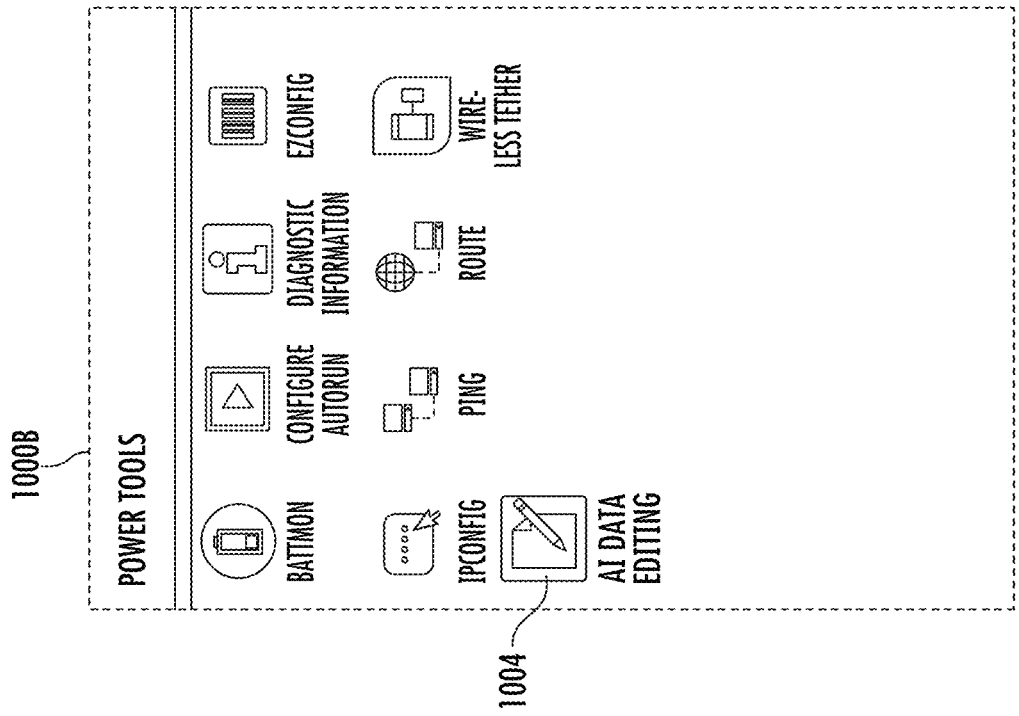
FIG. 10B illustrates an example user interface that is rendered on a display in accordance with example embodiments of the present disclosure.
Figure 10A:
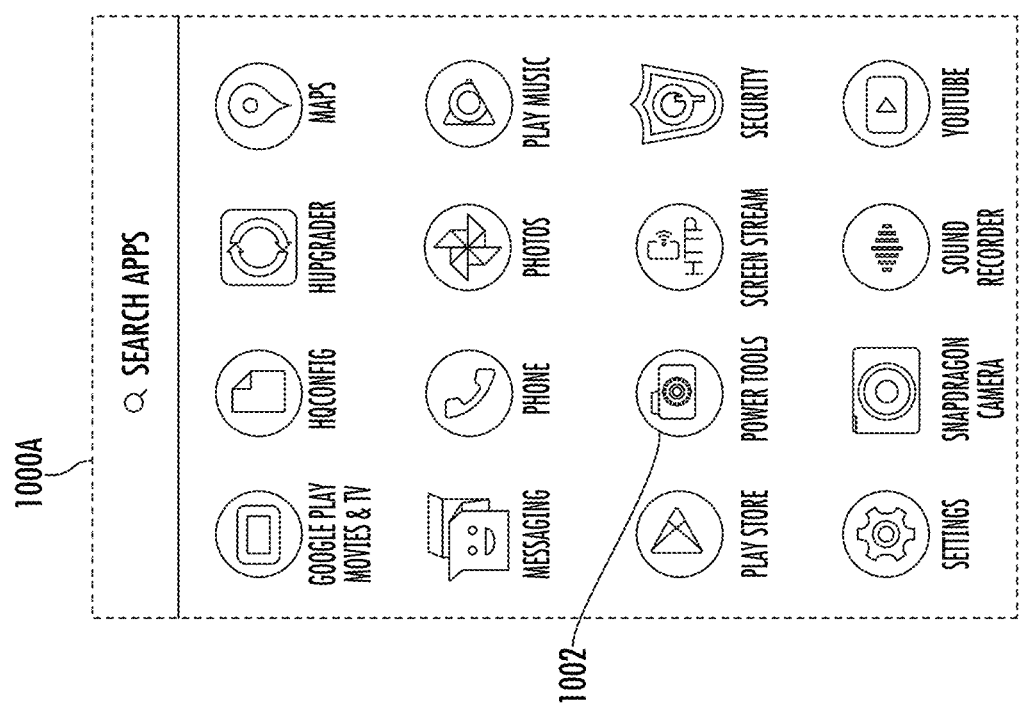
FIG. 10A illustrates an example user interface that is rendered on a display in accordance with example embodiments of the present disclosure.

Referring now to FIG. 10A to FIG. 10B, example user interfaces are illustrated. The example user interfaces may be rendered to a display of a computing device that has installed the software plugin described above.

In some embodiments, in order to trigger rendering of a predictive indicia data editing user interface in accordance with various embodiments of the present disclosure, the user may operate the computing device to navigate to the user interface 1000A. In the example shown in FIG. 10A, the user interface 1000A may be an application listing user interface that comprises user interface elements corresponding to software applications installed on the computing device. In particular, the user interface 1000A may comprise a user interface icon 1002 that corresponds to power tool applications that are installed on the computing device. In this example, the power tool applications may include one or more software applications that are associated with indicia data capturing and editing operations.

In some embodiments, when a user clicks, taps and/or otherwise selects the user interface icon 1002, the user interface 1000A may be updated to the user interface 1000B shown in FIG. 10B.

In the example shown in FIG. 10B, the user interface 1000B may comprise a power tool application user interface that comprises user interface elements corresponding to power tool applications. For example, the user interface 1000B may comprise an AI data editing user interface icon 1004 that allows users to trigger rendering a predictive indicia data editing user interface in accordance with various examples described herein.

In some embodiments, when a user clicks, taps and/or otherwise selects the AI data editing user interface icon 1004, the user interface 1000B may be updated to include a predictive indicia data editing user interface (for example, but not limited to, those illustrated in connection with at least FIG. 11A to FIG. 11C).

Figure 11A:
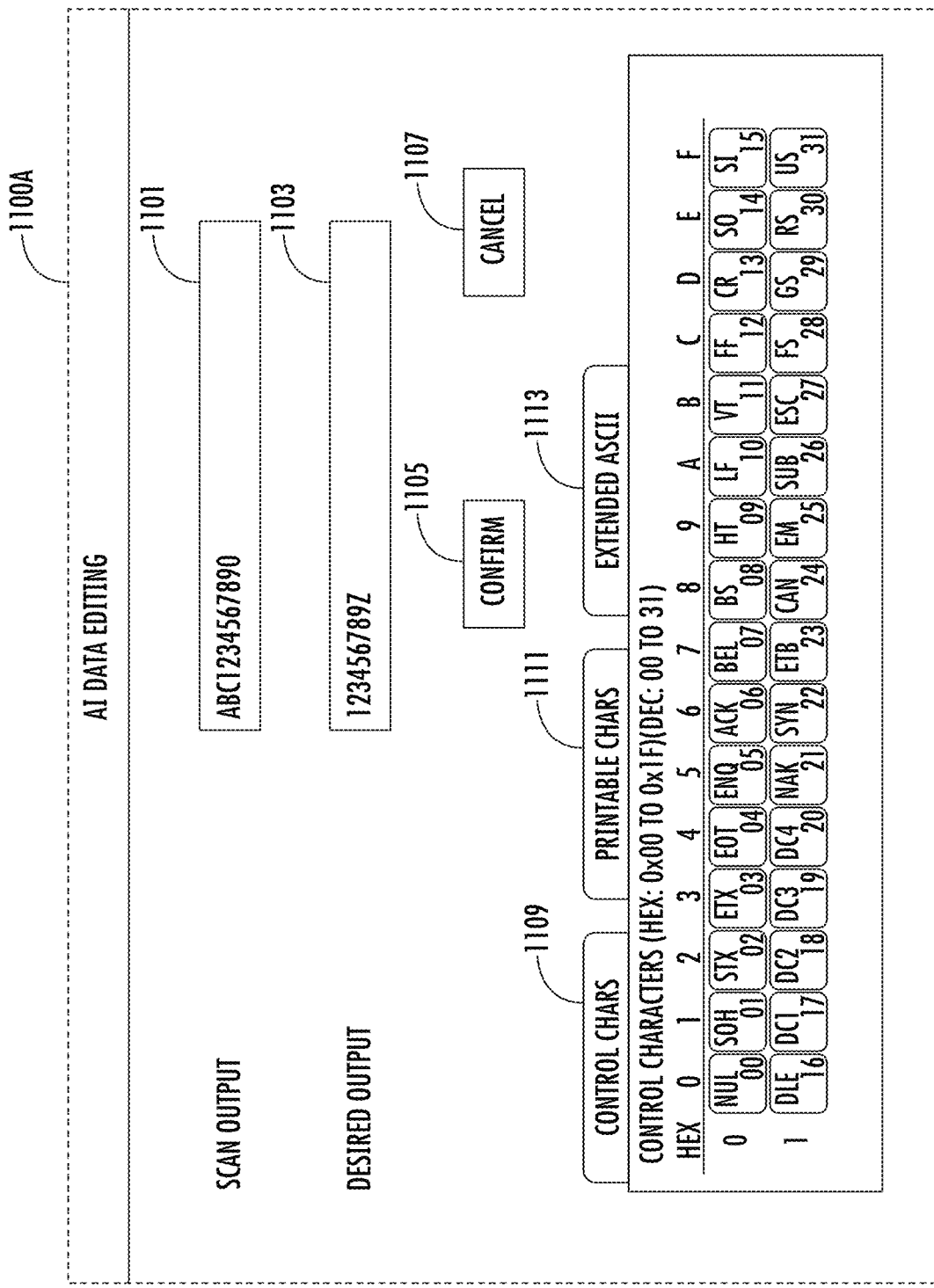
FIG. 11A illustrates an example predictive indicia data editing user interface that is rendered on a display in accordance with example embodiments of the present disclosure.
Figure 11B:
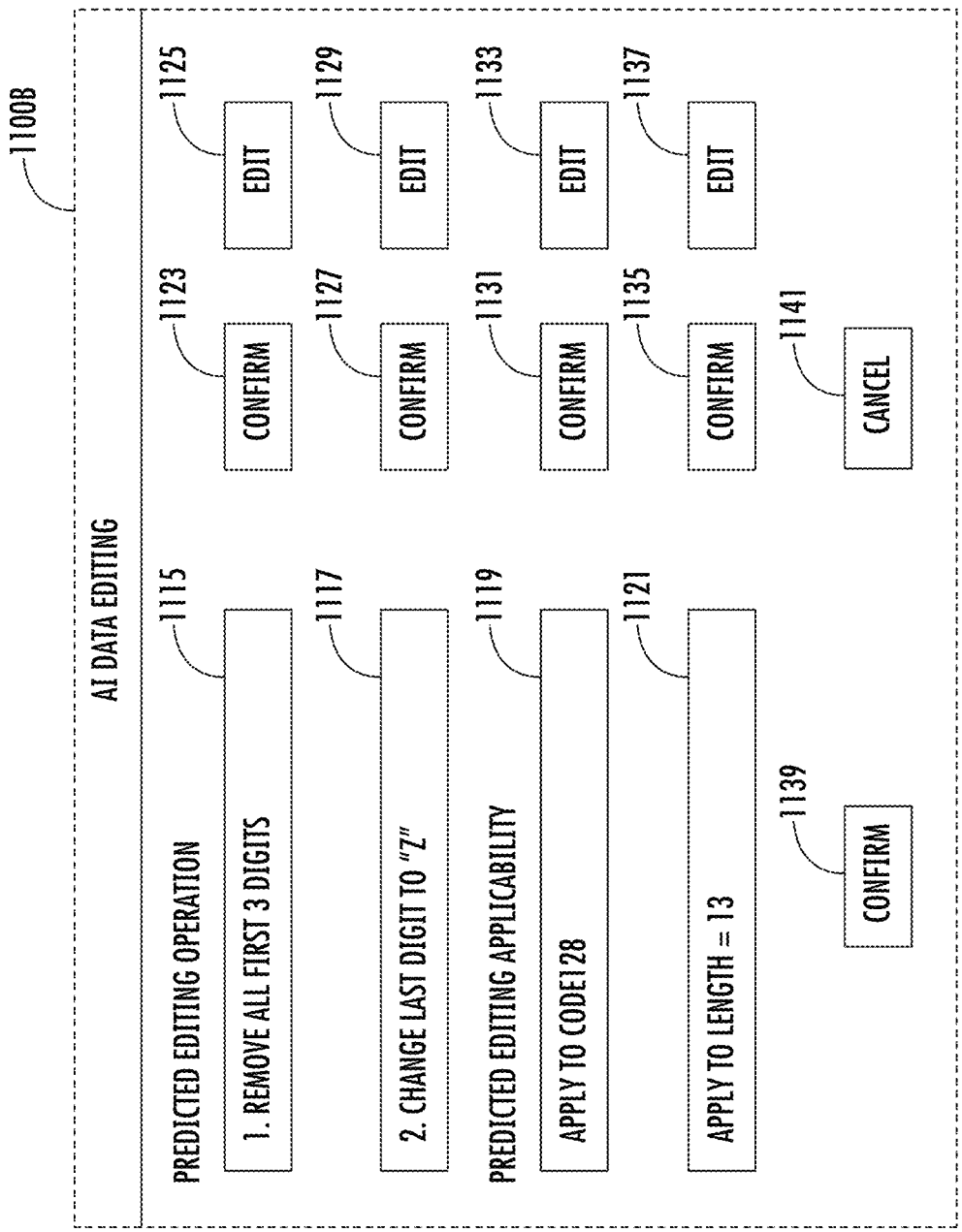
FIG. 11B illustrates an example predictive indicia data editing user interface that is rendered on a display in accordance with example embodiments of the present disclosure.
Figure 11C:
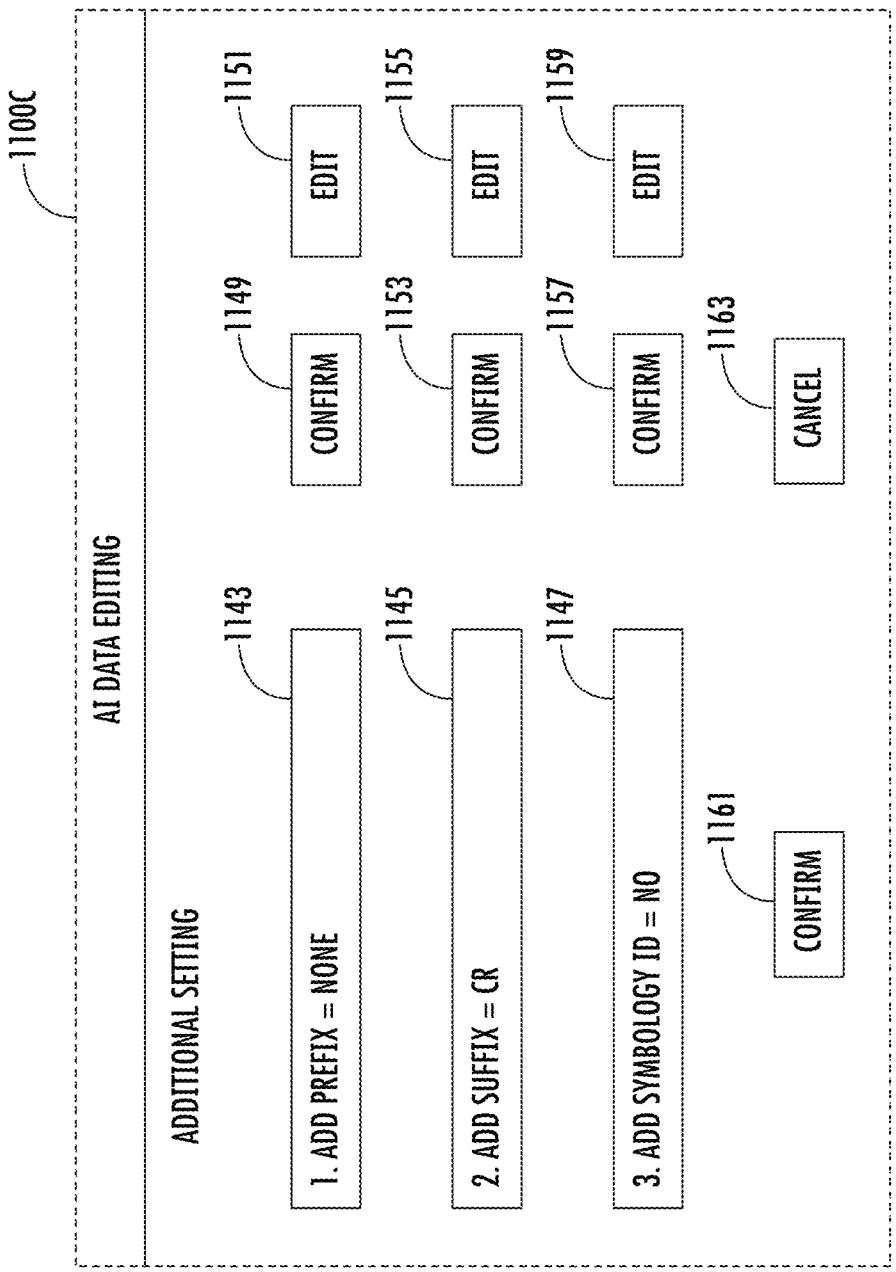
FIG. 11C illustrates an example predictive indicia data editing user interface that is rendered on a display in accordance with example embodiments of the present disclosure.

Referring now to FIG. 11A to FIG. 11C, example predictive indicia data editing user interfaces in accordance with various embodiments of the present disclosure are illustrated.

Referring now to FIG. 11A, an example predictive indicia data editing user interface 1100A in accordance with various embodiments of the present disclosure is provided. In particular, the example predictive indicia data editing user interface 1100A comprises user interface elements that illustrate a decoded data string associated with an indicia and allow a user to provide user input data that specifies an input data string corresponding to the same indicia.

In the example shown in FIG. 11A, the example predictive indicia data editing user interface 1100A may comprise a scan output user interface section 1101. In some embodiments, the scan output user interface section 1101 may comprise texts and/or characters that correspond to a decoded data string. For example, the decoded data string may be determined in accordance with various embodiments described herein. As an example, the scan output user interface section 1101 may comprise texts that indicate the decoded data string corresponding to the indicia is ABC1234567890.

In some embodiments, the example predictive indicia data editing user interface 1100A may comprise a user input interface section 1103. In some embodiments, the user input interface section 1103 may allow a user to input texts and/or characters that correspond to the input data string. For example, the user input interface section 1103 may comprise an input box that allows a user to type in texts and/or characters, and a processor may determine these texts and/or characters as the input data string. As an example, a user may input 123456789Z to the user input interface section 1103, which indicates that the input data string corresponding to the indicia is 123456789Z.

In some embodiments, the example predictive indicia data editing user interface 1100A may comprise one or more additional virtual keyboard user interface elements that allow users to input additional texts and/or characters that may not be included in a physical keyboard. For example, the example predictive indicia data editing user interface 1100A may include a control character keyboard user interface element 1109 that allows a user to input control characters to the user input interface section 1103 as at least a part of the input data string. Additionally, or alternatively, the example predictive indicia data editing user interface 1100A may include a printable character keyboard user interface element 1111 that allows a user to input printable characters to the user input interface section 1103 as at least a part of the input data string. Additionally, or alternatively, the example predictive indicia data editing user interface 1100A may include an extended ASCII character keyboard user interface element 1113 that allows a user to input extended ASCII characters to the user input interface section 1103 as at least a part of the input data string.

In some embodiments, the input data string and the decoded data string are associated with the same indicia. As described above, the decoded data string that is illustrated in the scan output user interface section 1101 may be determined based on indicia imaging data that is captured by an indicia data capturing device and associated with an indicia. In some embodiments, a user may provide the input data string that indicates a data string formatted based on the user requirements and is associated with the same indicia.

As an example, the decoded data string associated with an indicia may comprise the following texts and/or characters shown in TABLE 1:

TABLE 1

| EXAMPLE DECODED DATA STRING |
| --- |
| 2108CRLF |
| 1601000025CRLF |
| 0000CRLF |
| 8C5LLH2CRLF |

In some embodiments, the user may provide the following input data string that corresponds to the same indicia:

1601000025<tab>0000<tab>2108<tab><enter>

As shown in the example above, the input data string may comprise control characters such as "<tab>" and "<enter>."

In some embodiments, the example predictive indicia data editing user interface 1100A may comprise a confirm button user interface element 1105 and a cancel button user interface element 1107.

In some embodiments, when a user decides to cancel generating the predictive indicia data editing model, the user may click, tap, or otherwise select the cancel button user interface element 1107.

In some embodiments, when a user completes providing user input to the user input interface section 1103 and is ready for the processor to generate a predictive indicia data editing model, the user may click, tap, or otherwise select the confirm button user interface element 1105. In some embodiments, subsequent to the user clicking, tapping, and/other otherwise selecting the confirm button user interface element 1105, a processor may generate a predictive indicia data editing model in accordance with various embodiments described herein, and the example predictive indicia data editing user interface 1100A may be updated to the example predictive indicia data editing user interface 1100B shown in FIG. 11B.

Referring now to FIG. 11B, the example predictive indicia data editing user interface 1100B is illustrated. In particular, the example predictive indicia data editing user interface 1100B may comprise at least one predictive indicia data editing user interface element based on the at least one predictive indicia data editing indication (including, but not limited to, at least one predictive editing applicability indication and at least one predictive editing operation indication).

In the example shown in FIG. 11B, at least one predictive indicia data editing user interface element may include the predictive indicia data editing user interface element 1115 and the predictive indicia data editing user interface element 1117 that correspond to the at least one predictive editing operation indication. For example, the predictive indicia data editing user interface element 1115 may graphically display texts indicating a predictive editing operation indication to remove all first 3 digits. As another example, the predictive indicia data editing user interface element 1117 may graphically display texts indicating a predictive editing operation indication to change the last digit to "Z."

Additionally, or alternatively, the at least one predictive indicia data editing user interface element may include the predictive indicia data editing user interface element 1119 and the predictive indicia data editing user interface element 1121 that correspond to the at least one predictive editing applicability indication. For example, the predictive indicia data editing user interface element 1119 may graphically display texts indicating a predictive editing applicability indication is to "apply to CODE 128" (e.g. when the symbology type of the decoded data string is CODE 128). As another example, the predictive indicia data editing user interface element 1121 may graphically display texts indicating a predictive editing applicability indication to "apply to length=13" (e.g. when the length of the decoded data string is 13).

In some embodiments, the example predictive indicia data editing user interface 1100B may comprise at least one confirm button user interface element corresponding to the at least one predictive indicia data editing user interface element, and at least one edit button user interface element corresponding to the at least one predictive indicia data editing user interface element.

For example, the predictive indicia data editing user interface 1100B may comprise a confirm button user interface element 1123 and an edit button user interface element 1125 that are positioned adjacent to the predictive indicia data editing user interface element 1115. In this example, when the user clicks, taps, and/or otherwise selects the confirm button user interface element 1123, a processor may receive a user selection input data associated with the confirm button user interface element 1123 indicating that the user approves the predictive editing operation indication corresponding to the predictive indicia data editing user interface element 1115. In some embodiments, the processor may update the scan setting module based at least in part on the at least one predictive indicia data editing indication, similar to those described above in connection with at least FIG. 5. When the user clicks, taps, and/or otherwise selects the edit button user interface element 1125, the processor may generate and render an updated predictive indicia data editing user interface that includes an edit option user interface element. In some embodiments, the user may provide user edit input data associated with the edit option user interface element, and the processor may generate at least one updated predictive indicia data editing indication and update the scan setting module based on the at least one updated predictive indicia data editing indication, similar to those described above in connection with at least FIG. 6.

Additionally, or alternatively, in the example shown in FIG. 11B, the example predictive indicia data editing user interface 1100B may comprise a confirm button user interface element 1127 and an edit button user interface element 1129 that are positioned adjacent to the predictive indicia data editing user interface element 1117. The confirm button user interface element 1127 may allow the user to confirm the predictive editing operation indication corresponding to the predictive indicia data editing user interface element 1117, and the edit button user interface element 1129 allows the user to edit the predictive editing operation indication corresponding to the predictive indicia data editing user interface element 1117.

Additionally, or alternatively, in the example shown in FIG. 11B, the example predictive indicia data editing user interface 1100B may comprise a confirm button user interface element 1131 and an edit button user interface element 1133 that are positioned adjacent to the predictive indicia data editing user interface element 1119. The confirm button user interface element 1131 may allow the user to confirm the predictive editing applicability indication corresponding to the predictive indicia data editing user interface element 1119, and the edit button user interface element 1129 may allow the user to edit the predictive editing applicability indication corresponding to the predictive indicia data editing user interface element 1119.

Additionally, or alternatively, in the example shown in FIG. 11B, the example predictive indicia data editing user interface 1100B may comprise a confirm button user interface element 1135 and an edit button user interface element 1137 that are positioned adjacent to the predictive indicia data editing user interface element 1121. The confirm button user interface element 1135 may allow the user to confirm the predictive editing applicability indication corresponding to the predictive indicia data editing user interface element 1121, and the edit button user interface element 1137 may allow the user to edit the predictive editing applicability indication corresponding to the predictive indicia data editing user interface element 1121.

While the description above provides examples of predictive indicia data editing indications, it is noted that the scope of the present disclosure is not limited to the description above. In some examples, an example predictive indicia data editing indication may comprise one or more additional and/or alternative predictive editing applicability indications and predictive editing operation indications.

For example, an example predictive indicia data editing indication may comprise a predictive editing operation indication that indicates rearrangements of one or more parts of the decoded data string to generate the predictive data string. Additionally, or alternatively, an example predictive indicia data applicability indication may indicate characteristic requirements such as, but not limited to, whether the decoded data string comprises one or more numbers or letters.

In some embodiments, the example predictive indicia data editing user interface 1100B may comprise a confirm button user interface element 1139 and a cancel button user interface element 1141. In some embodiments, when a user wants to cancel generating the predictive indicia data editing model, the user may click, tap, and/or otherwise select the cancel button user interface element 1141. In some embodiments, when a user completes confirming and/or editing the predictive indicia data editing indication, the user may click, tap, and/or otherwise select the confirm button user interface element 1139.

In some embodiments, in response to receiving user selection input data associated with the confirm button user interface element 1139, the processor may update the predictive indicia data editing model as applicable, and may update the scan setting module based at least in part on the predictive indicia data editing model. In some embodiments, in response to receiving user selection input data associated with the confirm button user interface element 1139, the predictive indicia data editing user interface 1100B may be updated to the predictive indicia data editing user interface 1100C shown in FIG. 11C.

Referring now to FIG. 11C, the example predictive indicia data editing user interface 1100C is illustrated. In particular, the example predictive indicia data editing user interface 1100C allows a user to provide additional predictive indicia data editing indication (such as, but not limited to, additional predictive editing applicability indication and/or additional predictive editing operation indication).

In the example shown in FIG. 11C, at least one predictive indicia data editing user interface element may include a prefix editing user interface element 1143, a suffix editing user interface element 1145, and a symbology identifier (ID) editing user interface element 1147. In some embodiments, the example predictive indicia data editing user interface 1100C comprises a confirm button user interface element and an edit button user interface element that correspond to each of the prefix editing user interface element 1143, the suffix editing user interface element 1145, and the symbology ID editing user interface element 1147.

For example, the example predictive indicia data editing user interface 1100C may comprise a confirm button user interface element 1149 corresponding to the prefix editing user interface element 1143, and an edit button user interface element 1151 corresponding to the prefix editing user interface element 1143. In this example, when the user clicks, taps, and/or otherwise selects the confirm button user interface element 1149, a processor may receive a user selection input data associated with the confirm button user interface element 1149 indicating that the user approves the predictive editing operation indication to add no prefix. In some embodiments, the processor may update the scan setting module based at least in part on the at least one predictive indicia data editing indication. When the user clicks, taps, and/or otherwise selects the edit button user interface element 1151, the processor may generate and render an updated predictive indicia data editing user interface that includes an edit option user interface element. In some embodiments, the user may provide user edit input data associated with the edit option user interface element, and the processor may generate at least one updated predictive indicia data editing indication (for example, including an updated prefix) and update the scan setting module based on the at least one updated predictive indicia data editing indication.

In some embodiments, the example predictive indicia data editing user interface 1100C may comprise a confirm button user interface element 1153 corresponding to the suffix editing user interface element 1145, and an edit button user interface element 1155 corresponding to the suffix editing user interface element 1145. The confirm button user interface element 1153 may allow the user to confirm adding a suffix <CR> as illustrated in the suffix editing user interface element 1145, and the edit button user interface element 1155 allows the user to edit the suffix.

In some embodiments, the example predictive indicia data editing user interface 1100C may comprise a confirm button user interface element 1157 corresponding to the symbology ID editing user interface element 1147, and an edit button user interface element 1159 corresponding to the symbology ID editing user interface element 1147. The confirm button user interface element 1157 may allow the user to confirm not to add or define a symbology ID as illustrated in the symbology ID editing user interface element 1147, and the edit button user interface element 1159 allows the user to edit or add a symbology ID.

While the description above provides examples of additional predictive indicia data editing indications that a user can add to a predictive indicia data editing model, it is noted that the scope of the present disclosure is not limited to the description above. In some examples, users may add one or more additional and/or alternative predictive indicia data editing indications to the predictive indicia data editing model.

As an example, an example keyboard module may provide a decoded data string or a predictive data string to multiple input fields of a software application. Continuing from the example above the user an where provides input data string "1601000025<tab>0000<tab>2108<tab><enter>," different parts of the input data string may be associated with different input fields of an asset management software application. For example, "1601000025" may be associated with an input field for an asset number, "0000" may be associated with an input field for an asset sub-number, and "2108" may be associated with an input field for a company code. In some embodiments, the predictive indicia data editing user interface 1100C may comprise input field association user interface elements that allow a user to define an input field association between a part of the decoded data string or the predictive data string and an input field associated with a keyboard module.

In some embodiments, the example predictive indicia data editing user interface 1100C may comprise a confirm button user interface element 1161 and a cancel button user interface element 1163. In some embodiments, when a user wants to cancel generating the predictive indicia data editing model, the user may click, tap, and/or otherwise select the cancel button user interface element 1163. In some embodiments, when a user completes adding the predictive indicia data editing indication, the user may click, tap, and/or otherwise select the confirm button user interface element 1161.

In some embodiments, in response to receiving user selection input data associated with the confirm button user interface element 1161, the processor may update the predictive indicia data editing model as applicable, and may update the scan setting module based at least in part on the predictive indicia data editing model in accordance with various examples described herein.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising:
at least one processor; and
at least one non-transitory memory comprising program code, wherein the at least one non-transitory memory and the program code are configured to, with the at least one processor, cause the apparatus to at least:
receive user edit input data to modify at least one edit option user interface element;
in response to modifying the at least one edit option user interface element, generate at least one updated predictive indicia data editing indication; and
update a scan setting module based at least in part on the at least one updated predictive indicia data editing indication.

2. The apparatus of claim 1, wherein the at least one non-transitory memory and the program code are configured to, with the at least one processor, cause the apparatus to:
render a predictive indicia data editing user interface;
receive user selection input data; and
render an updated predictive indicia data editing user interface.

3. The apparatus of claim 2, wherein the predictive indicia data editing user interface corresponds to a user interface that is rendered on a display of an indicia data editing device that provides artificial intelligence (AI) based indicia data editing.

4. The apparatus of claim 2, wherein the user selection input data is associated with at least one edit button user interface element, wherein the updated predictive indicia data editing user interface comprises the at least one edit option user interface element.

5. The apparatus of claim 4, wherein the user selection input data associated with the at least one edit button user interface element indicates a user request to change a predictive indicia data editing indication.

6. The apparatus of claim 4, wherein the at least one edit option user interface element on the updated predictive indicia data editing user interface displays an edit option associated with a predictive indicia data editing indication.

7. The apparatus of claim 4, wherein the user selection input data is associated with an edit button user interface element that is positioned adjacent to a predictive indicia data editing user interface element corresponding to a predictive editing applicability indication associated with a symbology type.

8. The apparatus of claim 2, wherein the at least one non-transitory memory and the program code are configured to, with the at least one processor, cause the apparatus to:
render the updated predictive indicia data editing user interface that comprises an edit option user interface element in a form of a drop-down menu user interface element.

9. The apparatus of claim 8, wherein the at least one non-transitory memory and the program code are configured to, with the at least one processor, cause the apparatus to:
receive the user edit input data associated with at least one option displayed in the drop-down menu user interface element, wherein the user edit input data is used to adjust at least one predictive indicia data editing indication, wherein the user selection input data is associated with at least one confirm button user interface element and is used to determine that a user confirms a predictive indicia data editing indication; and generate the at least one updated predictive indicia data editing indication based at least in part on the at least one predictive indicia data editing indication and the user edit input data.

10. The apparatus of claim 1, wherein the at least one non-transitory memory and the program code are configured to, with the at least one processor, cause the apparatus to update the scan setting module associated with an indicia data capturing device.

11. The apparatus of claim 10, wherein the scan setting module comprises executable computer program instructions that define scan settings of the indicia data capturing device.

12. The apparatus of claim 10, wherein the scan setting module comprises a data processing model to decode indicia imaging data to generate a decoded data string.

13. A data editing device comprising at least one processor and at least one non-transitory memory comprising program code, wherein the at least one non-transitory memory and the program code are configured to, with the at least one processor, cause the data editing device to at least:
- receive a user edit input data associated with at least one edit option user interface element;
- generate at least one updated predictive indicia data editing indication; and
- update a scan setting module based at least in part on the at least one updated predictive indicia data editing indication.

14. The data editing device of claim 13, wherein the at least one non-transitory memory and the program code are configured to, with the at least one processor, cause the data editing device to:
- render a predictive indicia data editing user interface;
- receive a user selection input data; and
- render an updated predictive indicia data editing user interface,
- wherein the predictive indicia data editing user interface corresponds to a user interface that is rendered on a display of an indicia data editing device that provides artificial intelligence (AI)-based indicia data editing.

15. The data editing device of claim 14, wherein the user selection input data is associated with at least one edit button user interface element, wherein the updated predictive indicia data editing user interface comprises the at least one edit option user interface element.

16. The data editing device of claim 15, wherein the user edit input data is used to adjust at least one predictive indicia data editing indication, wherein the user selection input data associated with the at least one edit button user interface element indicates a user request to change a predictive indicia data editing indication.

17. The data editing device of claim 14, wherein the at least one non-transitory memory and the program code are configured to, with the at least one processor, cause the data editing device to render the updated predictive indicia data editing user interface that includes an edit option user interface element in a form of a drop-down menu user interface element.

18. The data editing device of claim 17, wherein the at least one non-transitory memory and the program code are configured to, with the at least one processor, cause the data editing device to:
- receive the user edit input data associated with at least one option displayed in the drop-down menu user interface element, wherein the user edit input data is used to adjust at least one predictive indicia data editing indication, wherein the user selection input data is associated with at least one confirm button user interface element and is used to determine that a user confirms a predictive indicia data editing indication; and
- generate the at least one updated predictive indicia data editing indication based at least in part on the at least one predictive indicia data editing indication and the user edit input data.

19. The data editing device of claim 13, wherein the at least one non-transitory memory and the program code are configured to, with the at least one processor, cause the data editing device to:
- update the scan setting module associated with an indicia data capturing device, wherein the scan setting module comprises: executable computer program instructions that define scan settings of the indicia data capturing device; and a data processing model to decode indicia imaging data to generate a decoded data string,
- wherein the data editing device is configured to decode the indicia imaging data based on decode settings associated with the scan setting module to generate the decoded data string.

20. A method of updating a scan setting model comprising:
- receiving user edit input data associated with at least one edit option user interface element;
- generating at least one updated predictive indicia data editing indication; and
- updating a scan setting module based at least in part on the at least one updated predictive indicia data editing indication.

* * * * *